United States Patent
Fok et al.

(10) Patent No.: US 8,275,393 B2
(45) Date of Patent: Sep. 25, 2012

(54) METHODS AND APPARATUS FOR ADJUSTING THE QUALITY OF SERVICE RELATED TO LOCATION DETERMINATION IN A WIRELESS COMMUNICATION DEVICE

(75) Inventors: Kenny Fok, San Diego, CA (US); Eric Yip, San Diego, CA (US); Jagatpreet Singh, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 924 days.

(21) Appl. No.: 12/101,018

(22) Filed: Apr. 10, 2008

(65) Prior Publication Data
US 2008/0293436 A1 Nov. 27, 2008

Related U.S. Application Data

(60) Provisional application No. 60/939,370, filed on May 22, 2007, provisional application No. 60/939,369, filed on May 22, 2007, provisional application No. 60/991,573, filed on Nov. 30, 2007.

(51) Int. Cl.
*H04W 24/00* (2009.01)
(52) U.S. Cl. ............... 455/456.2; 455/456.6; 455/456.1; 455/457
(58) Field of Classification Search ............... 455/404.2, 455/456.1–457
See application file for complete search history.

(56) References Cited

U.S. PATENT DOCUMENTS

| | | | |
|---|---|---|---|
| 6,462,708 | B1 | 10/2002 | Tsujimoto et al. |
| 6,684,158 | B1 | 1/2004 | Garin et al. |
| 6,750,812 | B2 | 6/2004 | Mizugaki et al. |
| 7,151,939 | B2 | 12/2006 | Sheynblat |
| 2004/0185870 | A1* | 9/2004 | Matsuda ............ 455/456.1 |

FOREIGN PATENT DOCUMENTS

| | | |
|---|---|---|
| EP | 1443791 | 8/2004 |
| WO | 0203093 | 1/2002 |

OTHER PUBLICATIONS

International Search Report—PCT/US08/063100, International Search Authority—European Patent Office, Sep. 10, 2008.
Written Opinion—PCT/US08/063100, International Search Authority—European Patent Office, Sep. 10, 2008.

* cited by examiner

*Primary Examiner* — Patrick Edouard
*Assistant Examiner* — Ronald Eisner
(74) *Attorney, Agent, or Firm* — Linda G. Gunderson; Abdollah Katbab

(57) ABSTRACT

Methods, systems, devices and computer program products for executing a predetermined routine including one or more location determination modes to determine a geographic position, i.e., the location of a wireless communication device. In certain aspects, the predetermined routine may be configured to adjust the Quality of Service (QoS) for one or more of the location determination modes implemented in the routine. Based on the pre-configuration of the routine, adjustment of the QoS of one or more location determination modes may occur as a matter of course or the routine may be configured to adaptively adjust the QoS based on conditions, such as network conditions, environmental conditions and the like, existing at the point in time in which the location determination mode is executed.

13 Claims, 17 Drawing Sheets

METHODS AND APPARATUS FOR ADJUSTING THE QUALITY OF SERVICE RELATED TO LOCATION DETERMINATION IN A WIRELESS COMMUNICATION DEVICE

CLAIM OF PRIORITY UNDER 35 U.S.C. §119

The present Application for Patent claims priority to Provisional Application No. 60/939,370 entitled "Methods and Apparatus for Improved Position Location," filed May 22, 2007, and Provisional Application No. 60/991,573 entitled "Methods and Apparatus for Multi-Mode Location Determination in a Wireless Communication Device", filed Nov. 30, 2007, both of which are assigned to the assignee hereof and hereby expressly incorporated by reference herein.

BACKGROUND

1. Field

The disclosed aspects relate to wireless communication devices, and more particularly, to systems, methods and apparatus that provide for adjusting the Quality of Service (QoS) related to location determination in wireless communication devices and, in one embodiment, lowering the QoS after an unsuccessful location determination.

2. Background

Wireless communication devices, such as cellular telephones, portable computers and the like, have rapidly gained in popularity over the past decade. These devices are increasingly becoming multifaceted devices capable of providing a wide-range of functions. For example, today's cellular telephone may also embody computing capabilities, Internet access, electronic mail, text messaging, digital photographic capability, an audio/MP3 player, video gaming capabilities, video broadcast reception capabilities and the like.

In addition to the myriad of functions listed, mobile communication devices may be equipped with location determination devices and routines, such as Global Positioning System (GPS) sensors and routines or the like, that provide for the device to determine their respective geographic position at any point in time. Location information is most commonly used in navigation systems, which track geographic position with respect to a mapped destination, and may be incorporated with wireless communication devices, such as cellular telephones or the like. However, use of positioning information in wireless communication devices is not limited to navigational systems. Other applications may also rely on location information. For example, performance tracking systems, which may reside internally at the wireless device or externally at the network level, benefit from knowing the location at which a performance problem occurs, such as the location of a call drop, an out of service (OOS) occurrence or a call failure. Additionally, many other applications are relying on environmental characteristics of the device, such as the location of the device to modify or update the methodology of the application.

Currently various modes of operation exist for determining location. For example, GPS, Galileo, GLONASS (GLObal NAvigation Satellite System) or other satellite-based systems may rely on a Mobile Station-Based (MS-Based) mode, a Mobile Station-Assisted (MS-Assisted) mode, a Standalone mode or any other feasible mode currently known or known in the future. The various modes offer different methods for determining location. For example, in MS-Based mode the wireless device obtains information related to the location of satellites from a network Location Determining Entity (PDE) and then performs the location determination calculation at the wireless communication device. The satellite location information is commonly referred to as Ephemeris data and Almanac data. Almanac data is course orbital parameters for all the satellites in the system and is considered valid for up to several months. Ephemeris data by comparison is very precise orbital and clock correction for each satellite and is considered valid for about 30 minutes. Thus, in MS-Based mode a wireless device may, but is not always required to, obtain the information from the PDE depending on the currentness of the satellite information.

In MS-Assisted mode the wireless device relies on the PDE to perform the location and, as such, is required to communicate with the PDE each time a location determination is performed. Therefore, by comparison, while MS-based mode requires a wireless signal to communicate with the PDE for some of the location determinations, MS-assisted mode requires a wireless signal to communicate with the PDE for all of the location determinations.

In contrast, in Standalone mode all the functions are carried out at the wireless device and, since no PDE satellite information is required, no wireless signal is required. However, Standalone mode requires that the wireless device receive signals from at least four of the GPS satellites, while MS-Assisted mode can calculate a fix with few, and in some instances not any, satellites. Thus, Standalone mode has a high failure rate when attempts are made indoors, while the MS-Assisted mode has much higher availability indoors.

In current practice, the applicable location determination mode is defined by the application or is chosen at the initialization/start-up stage. Thus, the chosen mode applies to a location determinations request even if the mode may not be the best mode for all scenarios. Various conditions may exist throughout the executing duration of an application that are relevant to the effectiveness of the chosen mode. For example, MS-Assisted mode requires a wireless signal, such as a CDMA (Code Division Multiple Access) signal or GSM (Global System for Mobile) signal and, therefore, if the chosen mode is MS-Assisted, location determination will not occur if a wireless connection is not available. Other conditions that affect the performance of location determination modes are the current environment of the device, battery life, voice call state, data call state, the currentness of the satellite information and the like.

In addition to relying on satellites to determine location, MS-Assisted mode will record the current network parameters to obtain a network-based location determination. Network parameters and associated network-based location determination refers to any terrestrial-based parameters and terrestrial-based location determination. Examples of network-based methods used to determine wireless device location include, but are not limited to, Advanced Forward Link Trilateration (AFLT), Enhanced Forward Link Trilateration (EFLT), Enhanced Observed Time Difference (EOTD), Observed Time Difference of Arrival (OTDOA) and the like. AFLT is the method generally associated with MS-Assisted mode and is a wireless device-based location determination that uses a phase offset technique to determine location. To determine location, the wireless device takes measurements of signals from nearby cellular base stations and reports the pilot phase measurements back to the network, which are then used to trilaterate an approximate location of the wireless device. Characteristically, network-based methods tend to be less accurate than satellite-based location fixes.

As previously noted, satellite-based location determination methods generally require information from at least three satellites. Thus, the wireless device must be located in an area capable of receiving information from multiple satellites.

Indoor locations, dense urban areas, and certain natural structures, like canyons and the like, may offer challenges to accurate and time efficient satellite fixes. In addition, other limitations such as erratic ionospheric conditions, noise at the wireless device level and the like may prohibit obtaining a satellite-based fix or impact the accuracy of the satellite-based fix. In these instances, it may be desirable to rely on network-based parameters to obtain a network-based location determination.

In the same regard, certain wireless device applications that require location information may favor a faster location determination fix even if some degree of accuracy is sacrificed. For example, in the mobile environment, applications that track the occurrence of a call event, such as a call drop, a call failure or the like, may be more concerned with determining the location at the moment the call event occurs as opposed to determining a more accurate location at a point in time removed from the call event. This is especially evident in the scenario in which the call event occurs in a moving vehicle; the call event tracking application desires an immediate location determination fix, regardless of accuracy, to be able to associate location with the call event. If the call event tracking application has to wait a certain amount of time for the location determination fix, the resulting location may be a significant distance from the location at which the call event occurred, depending on the speed of the vehicle. In this instance, the application may place a higher priority on speed at which a location is determined as opposed to the precise accuracy of the determined location.

Therefore, a need exists to provide systems and methods for accelerating location determination in wireless communication devices. As such, the desired systems and methods may provide more efficient location fixes, in terms of time to process the location fix. Such systems and method will greatly benefit applications that place a higher priority on the speed at which a fix is obtained as opposed to the accuracy of the fix. In addition, the desired systems and methods should take into account conditions that exist at the point in time when a location determination is made to insure the likelihood of location determination success and further expedite the location determination process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented infra.

Present aspects provide for methods, devices, systems and computer program products for accelerating location determination in a wireless communication device. Specifically, aspects of the predetermined routine may be configured to adjust the Quality of Service (QoS) for one or more of the location determination modes implemented in the routine. QOS settings enable an application to modify the balance between speed of fix and accuracy, the two parameters generally being inversely related in any given scenario. Based on the pre-configuration of the routine, adjustment of the QoS used in one or more location determination modes may occur as a matter of course or the routine may be configured to dynamically adjust the QoS based on surrounding conditions, such as network conditions, environmental conditions and the like, existing at the point in time in which the location determination mode is executed or adaptively adjust the QoS based on historical conditions that affect location determination.

In one aspect, a method for location determination in a wireless communication device is defined. The method includes providing for a predetermined location determination routine that includes a plurality of location determination modes at least one of which is a Quality of Service (QoS) adjustable location determination mode. The method further includes receiving a request for a location of the wireless communication device and attempting to obtain a location of the wireless communication device by executing a first location determination mode from the predetermined location determination routine. Additionally the method includes adjusting the QoS of the QoS adjustable location determination mode to a lower level, if the attempt to obtain a location by executing the first location determination mode fails, attempting to obtain the location of the wireless communication device by executing the QoS adjustable location determination mode; and storing in memory a result of the attempt to obtain the location of the wireless communication device by executing the QoS adjustable location determination mode.

In one aspect of the method the Quality of Service (QoS) adjustable location determination mode is further defined as Mobile Station-Assisted mode (MS-Assisted mode), which characteristically provides for recording network parameters and obtaining a network-based location determination in addition to providing a satellite-based location determination. If the QoS of the MS-Assisted mode is set low, for example, to a minimum level, such as zero, the mode will only have sufficient time to record the current network parameters and characteristically not enough time to search for satellite signals. In this instance, the mode will generally only obtain a network-based location determination fix.

In an additional aspect the method may include determining, prior to adjusting the QoS of the QoS adjustable location determination mode, whether to make a lower QoS adjustment for the QoS adjustable location determination mode. The determination as to whether to adjust the QoS may be based on pre-configuration of the predetermined location determination routine, existing conditions affecting location determination and/or historical conditions affecting location determination. Thus, determining whether to adjust the QoS based on existing conditions provides for dynamic adjustment of the QoS and determining whether to adjust the QoS based on historical conditions provides for adaptive adjustment of the QoS. Example of existing conditions and/or historical conditions include, but are not limited to, wireless signal state, voice call state, data call state, battery power state and location determination entity information state.

In one aspect the method may further include adjusting the QoS of the QoS adjustable location determination mode to a higher level after the attempt to obtain a location of the wireless communication device by executing the QoS adjustable location determination mode. The adjustment to the higher level may be a re-adjustment to a level prior to the lower level adjustment or the adjustment may be to a level above or below the previous level. The adjustment to the higher level may be necessary if the QoS adjustable location determination mode is subsequently attempted by the predetermined location determination routine. In such aspects, the method may further include determining, prior to adjusting the QoS of the QoS adjustable location determination mode to a higher level, whether to make a higher QoS adjustment for the QoS adjustable location determination mode. The determination may be based on preconfiguration of the routine existing conditions and/or historical conditions.

A further aspect is provided for by at least one processor configured to determine location in wireless device. The processor includes a first module for providing for a predetermined location determination routine that includes a plurality of location determination modes including a Quality of Service (QoS) adjustable location determination mode. The processor also includes a second module for receiving a request for a location of the wireless communication device and a third module for attempting to obtain a location of the wireless communication device by executing a first location determination mode from the predetermined location determination routine. Additionally, the processor includes a fourth module for adjusting the QoS of the QoS adjustable location determination mode to a lower level if the attempt to obtain a location by executing the first location determination mode fails, a fifth module for attempting to obtain the location of the wireless communication device by executing the QoS adjustable location determination mode and a sixth module for storing in memory a result of the attempt to obtain the location of the wireless communication device by executing the QoS adjustable location determination mode.

Another related aspect is defined by a computer program product that includes a computer-readable medium. The medium includes at least one instruction for causing a computer to provide for a predetermined location determination routine that includes a plurality of location determination modes including a Quality of Service (QoS) adjustable location determination mode. The medium additionally includes at least one instruction for causing the computer to receive a request for a location of the wireless communication device and at least one instruction for causing the computer to attempt to obtain a location of the wireless communication device by executing a first location determination mode from the predetermined location determination routine. Additionally, the medium includes at least one instruction for causing the computer to adjust the QoS of the QoS adjustable location determination mode to a lower level if the attempt to obtain a location by executing the first location determination mode fails, at least one instruction for causing the computer to attempt to obtain the location of the wireless communication device by executing the QoS adjustable location determination mode and at least one instruction for causing the computer to store in memory a result of the attempt to obtain the location of the wireless communication device by executing the QoS adjustable location determination mode.

Yet another related aspect is defined by a wireless communication device. The device includes means for providing for a predetermined location determination routine that includes a plurality of location determination modes including a Quality of Service (QoS) adjustable location determination mode. The device also includes means for receiving a request for a location of the wireless communication device and means for attempting to obtain a location of the wireless communication device by executing a first location determination mode from the predetermined location determination routine. Additionally, the device includes means for adjusting the QoS of the QoS adjustable location determination mode to a lower level if the attempt to obtain a location by executing the first location determination mode fails, means for attempting to obtain the location of the wireless communication device by executing the QoS adjustable location determination mode and means for storing in memory a result of the attempt to obtain the location of the wireless communication device by executing the QoS adjustable location determination mode.

A further aspect of the innovation is provided for by a wireless communication device. The device includes a computer platform including at least one processor and a memory. The device also includes a predetermined location determination routine stored in the memory and executable by the at least one processor. The routine includes a plurality of location determination mode including a Quality of Service (QoS) adjustable location determination mode that includes a QoS adjustable parameter. The parameter is operable to be adjusted to a lower level, such as a minimum level, if another location determination mode in the routine is executed and fails to obtain a fix. In one aspect of the device the QoS adjustable location determination mode is further defined as Mobile Station-Assisted mode (MS-Assisted mode).

Another aspect of the device includes a QoS adjuster stored in the memory and executable by the at least one processor. The QoS adjuster is operable to determine whether to make the lower QoS adjustment for the QoS adjustable location determination mode prior to adjusting the QoS. In such aspects, the QoS adjuster may be further operable to determine whether to make a dynamic lower QoS adjustment for the QoS adjustable location determination mode based on one or more existing conditions affecting location determination. In another aspect, the QoS adjuster may be further operable to determine whether to make an adaptive lower QoS adjustment for the QoS adjustable location determination mode based on historical conditions affecting location determination. The existing and/or historical conditions may include, but are not limited to, wireless signal state, voice call state, data call state, battery power state and location determination entity information state.

Thus, present aspects provide for methods, systems, devices and computer program products that improve the ability of the wireless device to determine location. According to present aspects, the predetermined routine may be configured to adjust the Quality of Service (QoS) for one or more of the location determination modes implemented in the routine. Based on the pre-configuration of the routine, adjustment of the QoS of one or more location determination modes may occur as a matter of course or the routine may configured to dynamically adjust the QoS based conditions, such as network conditions, environmental conditions and the like, existing at the point in time in which the location determination mode is executed or adaptively adjust the QoS based on historical conditions that affect location determination.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
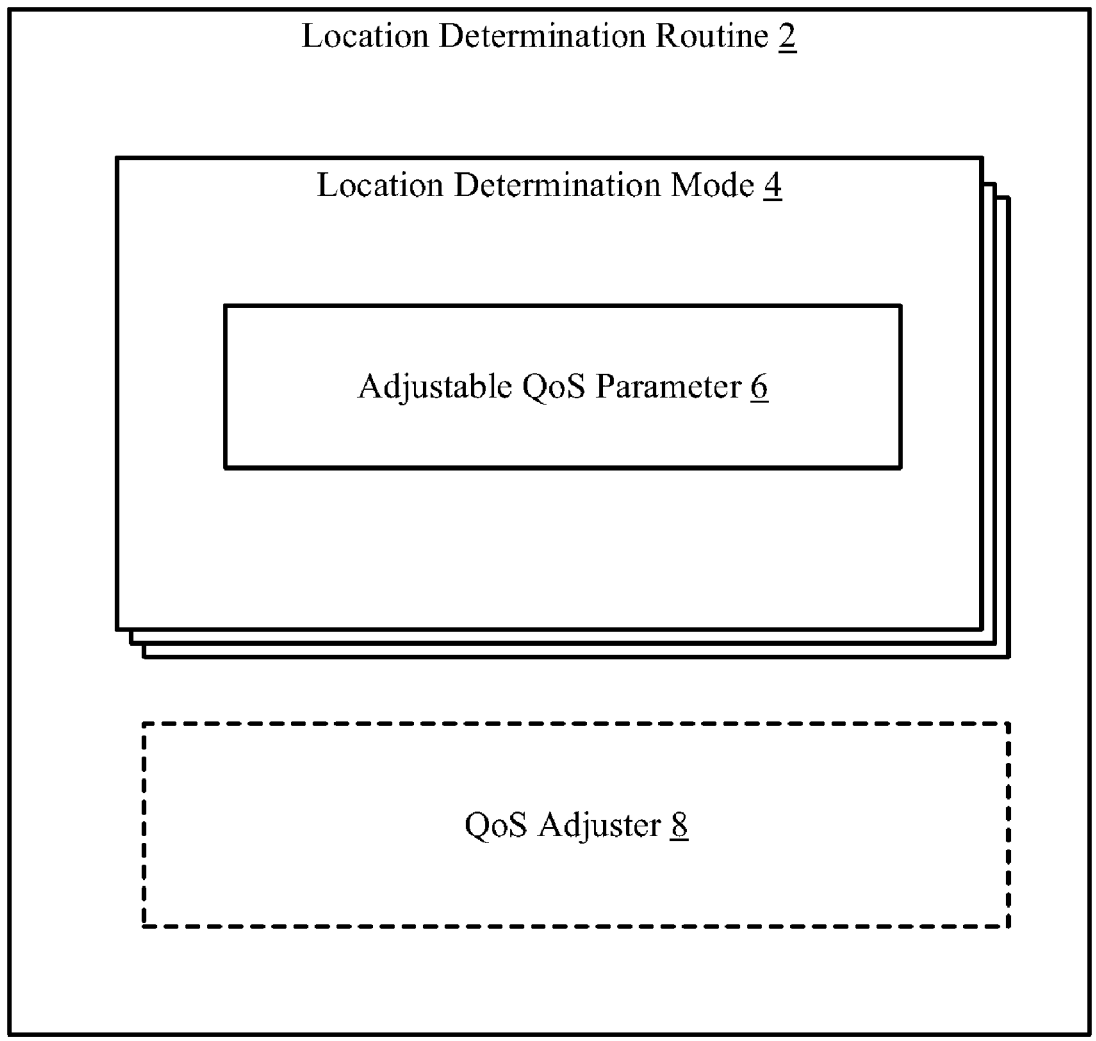
FIG. 1 is a block diagram of a location determination routine implemented in a wireless communication device, in accordance with a present aspect.

The present devices, apparatus, methods, computer-readable media and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects are described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Present aspects provide for systems, methods, devices and computer program products for executing a predetermined routine including one or more location determination modes to determine a geographic position, i.e., the location of a wireless communication device. In certain aspects, the predetermined routine may be configured to adjust the Quality of Service (QoS) for one or more of the location determination modes implemented in the routine. In one aspect, the QoS for a location determination mode may be adjusted lower after an unsuccessful location determination occurs within the routine. Based on the pre-configuration of the routine adjustment of the QoS of one or more location determination modes may occur as a matter of course or the routine may configured to adaptively adjust the QoS based conditions, such as network conditions, environmental conditions and the like, existing at the point in time in which the location determination mode is executed.

Currently various modes exist for determining location, many of the modes rely on satellite-based systems, such as Global Positioning System (GPS), Galileo, GLONASS (GLObal NAvigation Satellite System) and the like, for determining location. Examples of such modes include, but are not limited to, Mobile Station-Based mode (MS-Based mode), Mobile Station-Assisted (MS-Assisted mode), Standalone mode and the like.

Additionally, certain modes that rely on satellite-based systems, such as MS-Assisted mode and the like, record the current network parameters to obtain a network-based location determination. It is also possible for the location determination routine to implement modes that are solely based on network parameters and provide only network-based location determination. For example, if the predetermined routine does not include an MS-Assisted mode of location determination, the routine may be configured with a mode that is solely based on obtaining network parameters. Network-based location determination may include, but is not limited to, Advanced Forward Link Trilateration (AFLT), Enhanced Forward Link Trilateration (EFLT), Enhanced Observed Time Difference (EOTD) and the like. These network-based location determination methods rely on timing signals between network nodes, such as communication network base stations, Wi-Fi hotspots or any other communication network component.

In this regard, many wireless communication devices are configured to implement more than one location determination mode. This is generally necessary because individual location requesting applications, such as mapping applications, system diagnostic applications and the like, may be configured to request a location using a specific location determination mode.

According to certain aspects, the predetermined routine may determine which location determination mode(s) to execute on a per request basis. In this regard, the mode used to determine location may not be static. According to one or more of the present aspects, each instance of a location request results in the identification of one or more location determination modes based on a predetermined routine. In accordance with some present aspects, the predetermined routine may select the mode by sequencing through multiple trials and attempting multiple location determination attempts for each of the sequenced trials until a successful location determination results. In other aspects, the predetermined routine may select the mode by determining one or more existing conditions that affect location determination and selecting a location determination mode based on the existing condition(s). In some aspects, the predetermined routine may determine one or more existing conditions that affect location determination and identify a location determination mode if the existing conditions provide for determining location using the mode.

In addition to determining the mode based on conditions, the predetermined routine may be configured to adjust the QoS for one or more of the modes implemented in the routine based on one or more existing conditions that affect location determination or based on pre-configuration of the predetermined routine. In this regard, the application associated with the predetermined routine may place a high priority on the rate at which a location is determined and, as such, the QoS may be lowered for one or more of the modes implemented in the predetermined routine to assure that a fix is returned in an expedited manner. In other instances, existing conditions, such as network conditions, environmental conditions or the like may dictate that a higher QoS be implemented, such as restoring a location determination mode to its original QoS after the QoS has previously been lowered for a prior location determination fix.

In certain aspects, location determination provides for sequencing through multiple trials to determine which location-determination mode is capable of resulting in a successful location determination. The selection of which location-determination mode to attempt within a given trail may be based on current existing conditions that affect the location determination process.

Referring to FIG. 1, a block diagram is illustrated of a predetermined location determination routine 2 implemented by a wireless device to determine location, in accordance with an aspect of the present innovation. The predetermined location routine 2 may include one or more location determination modes 4. The modes 4 may include but are not limited to, MS-Based mode, MS-Assisted mode, Standalone mode, which rely on satellite based measurements to return a location fix and in some instances, such as MS-Assisted mode, provide network measurements applicable to provide a network-based location determination fix. In addition, modes 4 may include AFLT, EFLT, EOTD and the like, which rely on network-based measurements to return a location fix. Additionally, other satellite-based, network-based and/or hybrid location determination modes that currently exist or may exist in the future may be implemented without departing from the innovative concepts herein disclosed.

One or more of the location determination modes 4 within the predetermined routine 2 may include an adjustable QoS parameter 6 that defines the level of quality imparted to the location determination process. In this regard, QoS may be defined by how long the mode is allowed to search for necessary signals, such as satellite signals or network signals, necessary to provide the desired location fix (i.e., the search time). Thus, a higher QoS generally correlates to longer allowable search times while a lower QoS generally correlates to shorter allowable search times. Longer search times can assist in the location of a sufficient number of satellites, particularly in instances in which the wireless device is located indoors, in dense urban areas or heavily wooded areas.

Modes 4 having adjustable QoS parameters 6 are especially suited to hybrid modes that are capable of returning both satellite-based location fixes and network-based location fixes. Thus, in a hybrid mode, such as MS-Assisted mode, which provides for both satellite-based and network-based location determination, adjusting the QoS may determine which of the location determinations the mode returns. For example, if the QoS for MS-Assisted is set to a high level, the mode will generally have adequate time to search for requisite satellite signals and, as such, a more accurate satellite-based location determination results. Conversely, if the QoS for MS-Assisted is set to a low level, the mode may not have adequate time to search for requisite satellite signals and, as such, the only location that is returned is a less accurate network-based location determination. However, as previously discussed, in certain applications or instances the need to provide a location fix in a timely manner may have higher priority than the need to provide accuracy in terms of a precise location. In such applications or instances, reducing the QoS may be the preferred manner in which to implement the mode.

In Code Division Multiple Access (CDMA) communication networks the QoS for a location determination mode may range from about 8 to about 31. The value of the QoS represents the maximum number of seconds the search engine is provided to search for requisite satellites. If the QoS value is set low, a faster, more shallow and less sensitive search for satellites results. If the QoS value is set high a longer, deeper and more sensitive search for satellites results. In the instance of hybrid modes, such as MS-Assisted or the like, setting the QoS to a low value may result in only the ability to record necessary network parameters (and the subsequent network-based location determination returned) because inadequate time is provided to perform a satellite-based search. In one aspect of the innovation, the adjustable QoS may be set to a predetermined value, such as zero ("0") or some other predetermined value to assure that only network-based location determinations are obtained. In this aspect, setting the QoS to a value that limits the location determination process to network-based fixes assures that location determination process occurs as efficiently as possible in terms of time required to determine a location fix.

In addition the predetermined location determination routine 2 may include a QoS adjuster 8 operable to adjust the QoS parameter 6 for one or more location determination modes 4. As illustrated the QoS adjuster 8 may be a standalone program/component or the QoS adjuster 8 may be included within one or more of the location determination modes 4 that include the adjustable QoS parameter. The QoS adjuster may be operable to adjust the QoS for one or more location determination modes, based on existing conditions that exist at the time that a mode is to be implemented or based on historical conditions. As such the QoS adjuster 8 provides for QoS to be adjusted dynamically according to existing conditions and/or adaptively according to historical conditions.

In alternate aspects, in which adjustment to the QoS is limited to being preconfigured within the location determination routine, such that the QoS for a predetermined mode is adjusted to a predetermined level, the need for a QoS adjuster 8 may be obviated.

In one example, in which the QoS is adjusted based on preconfiguration of the routine 3, a first QoS, may be applied to a mode occurring at the onset of the predetermined location determination routine, such as mode that occurs after the initial location determination mode in the routine has failed, and a second QoS may be applied to the same mode implemented later in the predetermined location determination routine. In this example, the first QoS may be set low to assure that only network-based searching and network-based location determinations occur and the second QoS may be set high or re-stored to an original setting to allow for adequate time to search for satellites and thus determine a satellite-based location.

In another example, in which the QoS adjuster relies on existing conditions to adjust the QoS, the QoS adjuster may determine or identify the requisite existing conditions, such as network conditions, environmental conditions or the like, to determine if QoS adjustment is warranted and, if so, the appropriate amount or level of QoS adjustment. For instance, assessment of existing conditions may determine that a satellite-based location determination attempt would be futile and, therefore, QoS may need to be adjusted to lower levels so that only requisite time is provided to record the current network parameters.

In yet another example, in which the QoS adjuster relies on historical conditions to adjust QoS, the QoS adjuster may access a historical condition database to determine if historical conditions dictate QoS adjustment and, if so, the appropriate amount or level of QoS adjustment. For example, if historical data indicates that during a particular time of day and/or week the wireless device is typically located in an office building within a dense urban area, the QoS adjuster may need to set the QoS to a low or minimal level at that particular time of day and/or week because the likelihood of successfully determining a satellite-based location determination may be minimal. In other aspects, the historical conditions may be relied upon by the QoS adjuster to continuously adjust the QoS level for one or more modes 4 depending on the historical conditions of the network, environment or the like. In this regard, the QoS adjuster may be constantly monitoring the historical conditions affecting location determination and adaptively adjusting QoS parameters in response to the historical conditions.

Figure 2:
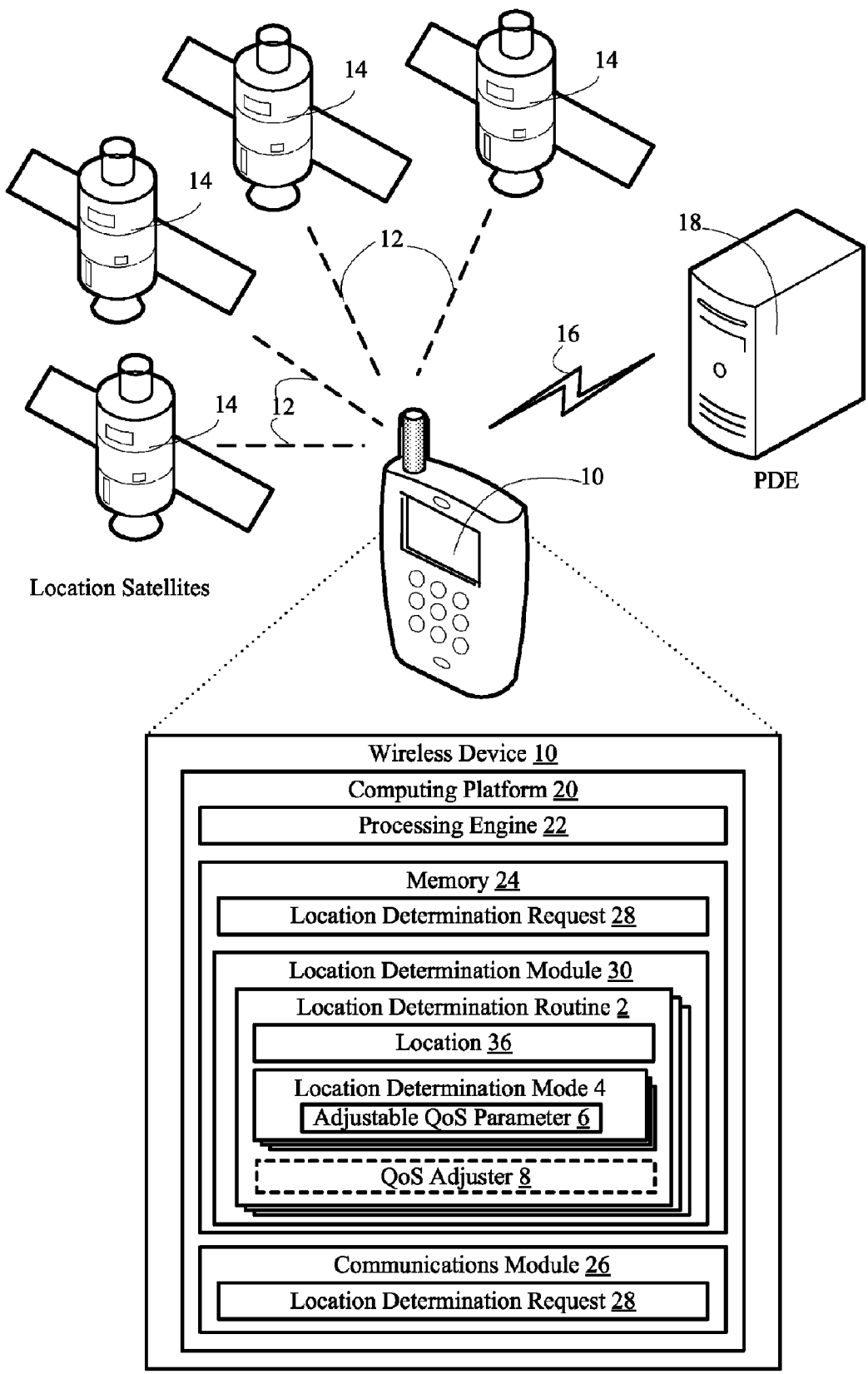
FIG. 2 is a schematic diagram of a system operable for selecting a location determination mode to determine a device location based on a predetermined routine, according to an aspect.

Referring to FIG. 2, a block diagram is depicted of a wireless communication device configured for location determination, according to present aspects. Wireless communication device 10 is operable to determine location based on the identification of at least one location determination predetermined routine. As such, wireless communication device 10 is capable of receiving satellite signals 12 from location satellites 14, such as GPS, Galileo, GLONASS satellites or the like. Received satellite signals 12 are used by one or more of the location determination modes to determine the location of the wireless device. In addition, wireless communication device 10 is in wireless communication 16 with Position Determining Entity 18. In some location determination modes, the PDE provides the wireless communication device with location information, such as data used to locate satellites 14, and in some aspects PDE 18 performs the final location calculation. In other satellite-based location determination modes, communication with the PDE is not required.

The wireless communication device 10 includes a computing platform 20 having a processing unit 22 and a memory 24. Computer platform 20 also includes a communications module 26 operable for transmitting and receiving wireless communication 16 and receiving satellite signals 12. Location determination requests 28, commonly referred to as fixes, may originate from applications (not shown in FIG. 2) stored in memory 24 and executable on wireless device 10. Alternatively, location determination requests 28 may be wirelessly received by the communication module 26 in response to requests by wireless network devices (not shown in FIG. 2).

Memory 24 also includes a location determination module 30 that is operable to attempt location determination for the wireless device 10 based on received location determination requests 26. The location determination module 30 includes at least one predetermined mode routine 2 that is operable to identify at least one location determination mode 4 on a per location request basis. Location determination modes 32 may include, but are not limited to, MS-Based mode, MS-Assisted mode, Standalone mode and any other known or future known satellite-based or hybrid-based location determination modes. Additionally, location determination modes 32 may include network-based determination modes such as, such as AFLT, EFLT, EOTD and the like, which determine location based on timing signals between network base stations.

As discussed in relation to FIG. 1, one or more of the location determination modes 4 may include an adjustable QoS parameter 6 and, as such, the mode routine 2 may include a QoS adjuster 8 operable to adjust the QoS for the specified location determination mode dynamically adjust the QoS based on existing conditions, such as existing network conditions, existing environmental conditions or the like and/or adaptively adjust the QoS based on historical conditions, such historical network conditions, historical location patterns, historical environmental conditions and the like. Alternatively, in other aspects, QoS adjustment may be preconfigured in the routine 2, such that one or more predetermined modes 4 are defined that have a predetermined QoS adjustment level.

In some aspects, mode routine 2 may be configured to sequence through multiple trials trying to successfully determine a location 36. In addition, mode routine 2 may be configured to provide for multiple attempts within a given trial before the routine abandons the trial and moves to the next trial in the sequence. In other aspects, mode routine 2 may be configured to determine one or more existing conditions that affect location determination and select a mode and, in some aspects, a QoS level based on the determination of the one or more existing conditions. Existing conditions are defined as the current status or value of a wireless device condition. Examples of existing conditions include, but are not limited to, current wireless signal state, such as Code Division Multiple Access (CDMA) signal state or Global System for Mobile (GSM) communications signal state, Universal Mobile Telecommunications System (UMTS) signal state, Wireless Fidelity (Wi-Fi) signal state, Worldwide Interoperability for Microwave Access (WiMAX) signal state, current state of information communicated from the PDE, such as ephemeris data, almanac data and the like, current communications state, such as voice call state, data session state or the like, current battery power state, current environmental condition(s) state, such as visibility or received signal strength of the satellites, and any other existing conditions which may affect location determination.

Figure 3:
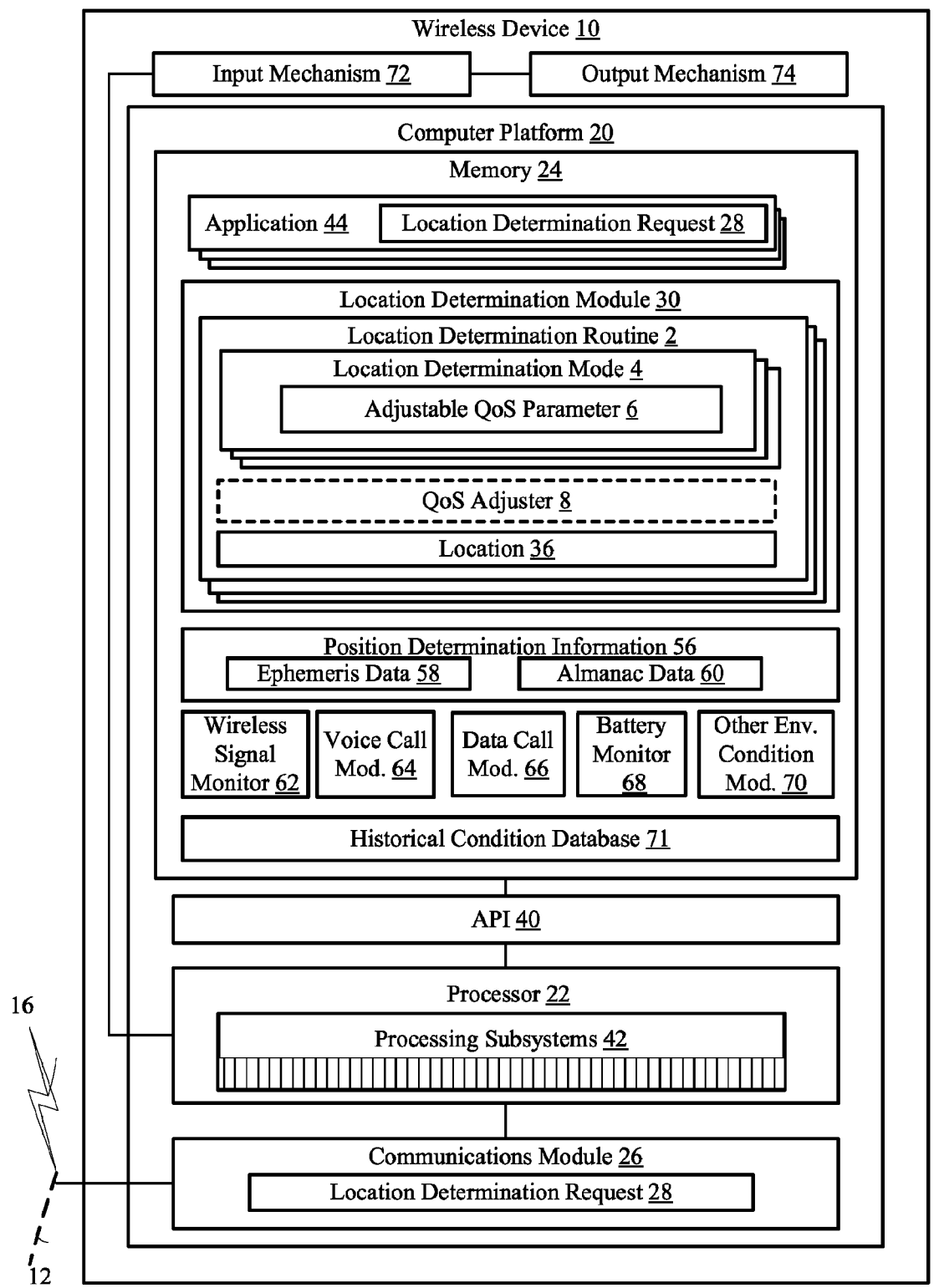
FIG. 3 is a block diagram of a wireless communication device operable for selecting a location determination mode to determine a device location based on a predetermined routine, according to an aspect.

Referring to FIG. 3, according to one aspect, a detailed block diagram representation of wireless communication device 10 is depicted. The wireless communication device 10 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 10 includes computer platform 20 that can transmit data across a wireless network, and that can receive and execute routines and applications. Computer platform 20 includes memory 24, which may comprise volatile and nonvolatile memory such as read-only and/or random-access memory (RAM and ROM), EPROM, EEPROM, flash cards, or any memory common to computer platforms. Further, memory 24 may include one or more flash memory cells, or may be any secondary or tertiary storage device, such as magnetic media, optical media, tape, or soft or hard disk.

Further, computer platform 20 also includes processor 22, which may be an application-specific integrated circuit ("ASIC"), or other chipset, processor, logic circuit, or other data processing device. Processor 22 or other processor such as ASIC may execute an application programming interface ("API") layer 40 that interfaces with any resident programs, such as location requesting applications 44, location determination module 30 and mode routines 2, stored in the memory 24 of the wireless device 10. However, API 40 is typically not capable of determining which location determination mode to use for a given location determination request. API 40 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processor 22 includes various processing subsystems 42 embodied in hardware, firmware, software, and combinations thereof, that enable the functionality of communication device 10 and the operability of the communication device on a wireless network. For example, processing subsystems 42 allow for initiating and maintaining communications, and exchanging data, with other networked devices. In aspects in which the communication device is defined as a cellular telephone the communications processor 22 may additionally include one or a combination of processing subsystems 42, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 3 for the sake of clarity). For the disclosed aspects, processing subsystems 42 of processor 22 may include any subsystem components that interact with the location determination module 30.

Computer platform 20 additionally includes communications module 26 embodied in hardware, firmware, software, and combinations thereof, that enables communications among the various components of the wireless communication device 10, as well as between the wireless device 10 and wireless network 16. In described aspects, the communication module 26 enables the communication of all correspondence between wireless communication device 10, the location satellites 14 (shown in FIG. 2) and the PDE 18 (shown in FIG. 2). Thus, communication module 26 may include the requisite hardware, firmware, software and/or combinations thereof for establishing a wireless network communication connection and for receiving satellite signals. In some aspects, the communication module may be operable to receive location determination requests 28 communicated from wireless network devices and/or network entities and to internally communicate the location determination requests 28 to the location determination module 30.

The memory 24 of computer platform 20 may include one or more applications 44 that include location determination requests 28. Applications 44 may include a mapping application that allows a user to track their location in relation to a preferred destination, a performance diagnostic application that associates a location with a performance event, such as a call drop, a call failure, call success, an Out-Of-Service (OOS) event or the like, and any other application that may require location information. It should be noted that for certain applications, for example a performance diagnostic application, location determination may occur in the background while other applications or features on the device are executing. For example, voice calls or data sessions (e.g. Internet sessions, Short Message Service (SMS) communication) may transpire while location determination attempts are being made.

Memory 24 of computer platform 20 includes location determination module 30 that is operable to attempt location determination for the wireless device 10 based on received location determination requests 26. The location determination module 30 includes at least one predetermined mode routine 2 that is operable identify at least one location determination mode 4 on a per location request basis. The location determination modes 4 may include satellite-based location determination modes network-based location determination modes 35 and hybrid location determination modes or the like. Hybrid location determination modes are defined as modes, which provide both satellite-based location determination and network-based location determination. The modes may include, but are not limited to, MS-Based mode, MS-Assisted mode, Standalone mode, AFLT mode, EFLT mode, EOTD mode and any other known or future known location determination mode.

MS-Based mode location determination is characterized in that calculation of the device location occurs at the wireless device and while PDE information 56, such as ephemeris data or almanac data, is required to determine the location, each location determination attempt may not require communication with the PDE 18 if the PDE information is current enough to determine location. If the wireless device requires updating of the PDE information 56, the wireless device communicates through the wireless network with the PDE 18 to obtain current ephemeris data and/or almanac data. Once the wireless device has verified or obtained PDE information 56, the wireless device uses the PDE information 56 to set the parameters for receiving the satellite signals and, subsequently receives the timing signals broadcasted from the satellites. Once the satellite signals are received, the wireless device decodes the signals using the PDE information 56 to aid in setting the decode parameters. The wireless device then uses the decoded timing information and executes a location determination function to determine device location.

MS-Assisted mode location determination is characterized in that calculation of the device location occurs at the PDE 18 and, as such, communication with the PDE 18 is required for each location determination attempt that uses MS-Assisted mode. If the wireless device requires updating of the PDE information 56, the wireless device communicates through the wireless network with the PDE 18 to obtain current ephemeris data and/or almanac data. Once the wireless device has verified or obtained PDE information 56, the wireless device uses the PDE information 56 to set the parameters for receiving the satellite signals and, subsequently receives the timing signals broadcasted from the satellites. Once the satellite signals are received, the wireless device decodes the signals using the PDE information 56 to aid in setting the decode parameters. The wireless device uses the decoded timing information to make measurements related to the distance from the satellites and the wireless device communicates the measurement information to the PDE. The PDE 18 uses the measurement information and executes a location determining function to determine the location of the wireless device. Thus, for MS-Assisted mode a wireless network signal must be active because MS-Assisted mode requires that the location calculation occur at the PDE 18.

In addition, MS-Assisted mode may be configured to record current network parameters and obtain a network-based location determination in instances in which a satellite-based measurement is not available or unreliable. As such, MS-Assisted mode may be characterized as a hybrid mode and is especially suited to having an adjustable QoS parameter 6. For example, by adjusting the QoS to a lower level, MS-Assisted mode will have minimal or no time to search for satellite signals and therefore, in most instances, will return a network-based location result. However, if the QoS is adjusted to a higher level or re-stored to an original setting, MS-Assisted mode may have sufficient time to acquire the necessary satellite signals and, therefore, may return a more accurate satellite-based location fix.

Standalone mode is characterized in that calculation of the device location occurs at the wireless device and no PDE information 56 is required to determine location. However, Standalone mode is generally the most processing intensive satellite-based mode and, thus, utilizes the most battery power in a wireless device application. In the Standalone mode of operation location determination is performed using only satellite data; no network assistance data is required. In Standalone mode the wireless device receives timing signals broadcasted from satellites. The wireless device uses the timing signals and executes a location determining function (64) to determine a device location.

AFLT mode is characterized by the wireless device taking measurements of signals from nearby base stations and reports the time and/or distance readings back to the communication network, which are then used to triangulate an approximate location of the wireless device. In general, at least three surrounding base stations are required to get an optimal AFLT position fix. Like other network-based location determination modes, while AFLT is generally considerably less accurate than satellite-based location determination fixes, and while AFLT fixes may not include altitude and velocity information, AFLT provides for an efficient or a more likely successful location determination in instances in which satellite-based fixes are not available or otherwise undeterminable.

Figure 5:
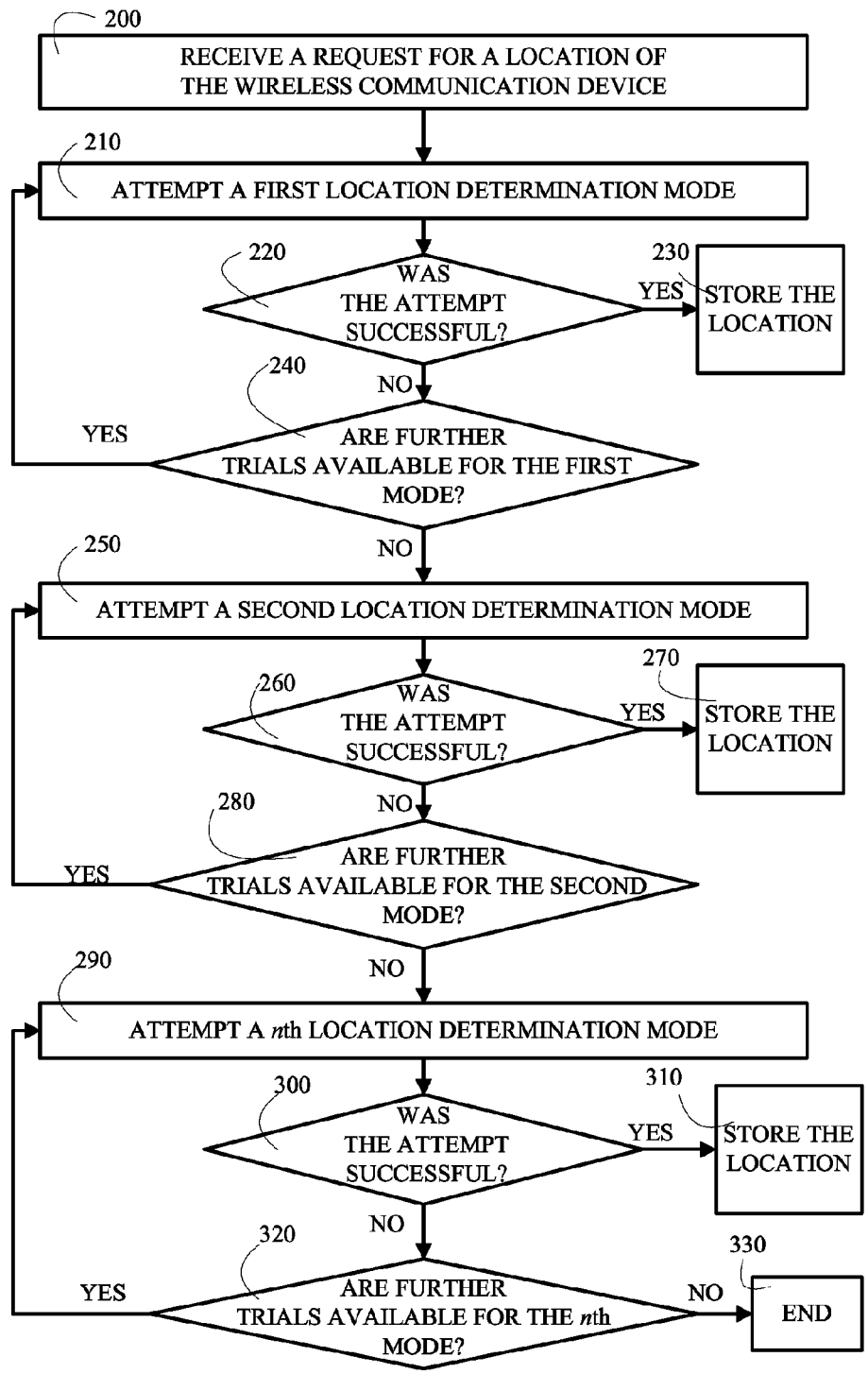
FIG. 5 is a flow diagram of a method for location determination in a wireless device that provides for sequencing through a plurality of modes to determine a location, according to an aspect.

In some aspects, mode routine 2 may be configured to sequence through multiple trials trying to successfully determine a location 36. In addition, mode routine 2 may be configured to provide for multiple attempts within a given trial before the routine abandons the trial and moves to the next trial in the sequence. FIG. 5, which will be described in length infra. Provides for a mode selection method based on sequencing through trials and attempting multiple location determination attempts within a given trial. Sequencing through multiple trials and allowing for multiple attempts within a given trial allows for the mode routine 2 to prioritize modes based on the effectiveness, efficiency, past performance and battery power usage of the various sequenced modes. For example, in some routines 2, MS-Based mode may be the first mode in the sequence because it affords relatively high probability of success, only requires wireless communication with the PDE if the PDE information 56 requires updating, and limits the use of battery power. Conversely, in some routines 2, Standalone mode 52 may be the last mode in the sequence and may be limited to one attempt because it requires a high amount of battery power.

In other aspects, mode routine 2 may be configured to determine one or more existing conditions that affect location determination and select a mode and/or, in some instances determine whether QoS should be adjusted for that mode and, if so the level of QoS adjustment based on the determination of the one or more existing conditions. Examples of existing conditions include, but are not limited to, current wireless signal state, such as Code Division Multiple Access (CDMA) signal state or Global System for Mobile (GSM) communications signal state, Universal Mobile Telecommunications System (UMTS) signal state, Wireless Fidelity (Wi-Fi) signal state, Worldwide Interoperability for Microwave Access (WiMAX) signal state, current state of information communicated from the PDE, such as ephemeris data, almanac data and the like, current communications state, such as voice call state, data session state or the like, current battery power state, current environmental condition(s) state, such as visibility or received signal strength of the satellites, and any other existing conditions which may affect location determination. Thus, mode routine 2 may communicate with wireless signal monitor 62 to determine the current state of the wireless signal, voice call module 64 to determine if a voice call is currently active, and data call module 66 to determine if a data session is currently active. Additionally, mode routine 2 may communicate with PDE information module 56 to determine the currency of PDE information, such as ephemeris data 58 and almanac data 60, battery monitor 68 to determine the current battery power level and other environmental condition modules 70 to determine other environmental conditions that affect location determination. It should be noted that while the wireless signal monitor 62, the voice call module 64, data call module 66 and battery monitor 68 are described in the wireless device of FIG. 3 as modules and monitors residing in memory 24, in other aspects any or all of these modules and monitors may exist as processing subsystems 42 of processor 22.

In addition to choosing a mode based on the existing conditions, existing conditions may be used in mode routine 2 to suspend the determination of the location determination routine or to delay the determination of the location. For example, certain conditions, such as a voice call or data call occurring while a location attempt is being made, may adversely affect the performance of the voice call or data call. Rather than diminishing the user's experience by adversely affecting the voice call or data call, the mode routine 2 may be configured to delay the routine for a predetermined period of time or until the voice call or data call is ended or the mode routine 2 may be configured to suspend the routine.

In instances in which mode routine 2 is configured to determine more than one existing condition and select a mode based on the more than one existing conditions, the selection of the mode may be based on prioritizing the plurality of conditions to select a mode, weighting the plurality of conditions to select a mode or implementing any other logical decision making process to select a mode.

In some aspects, the mode routine 2 may be configured to determine one or more existing conditions and further determine whether an available mode may be attempted based on the existing conditions. For example, in one aspect, a wireless device may be limited to one location determination mode. In this aspect, one or more existing conditions may be determined and, subsequently, a decision is made as to whether to proceed with an attempt of the location determination mode based on the existing conditions. For example, if the wireless device is limited to MS-Assisted mode location determination and one of the existing conditions is the state of a wireless signal, determination that a wireless signal is not currently available will result in no attempt being made to use MS-assisted mode to determine location.

In some aspects, the mode routine 2 may be configured to determine one or more existing conditions and, based on the existing conditions, determine which mode is the best mode for location determine or the best sequence of modes for location determination. It should be noted that the best mode might be defined in terms of the mode that may yield the highest likelihood of a successful location determination or the mode that uses the least amount of device resources or the mode that properly balances the likelihood of success and limits the use of device resources.

Figure 7:
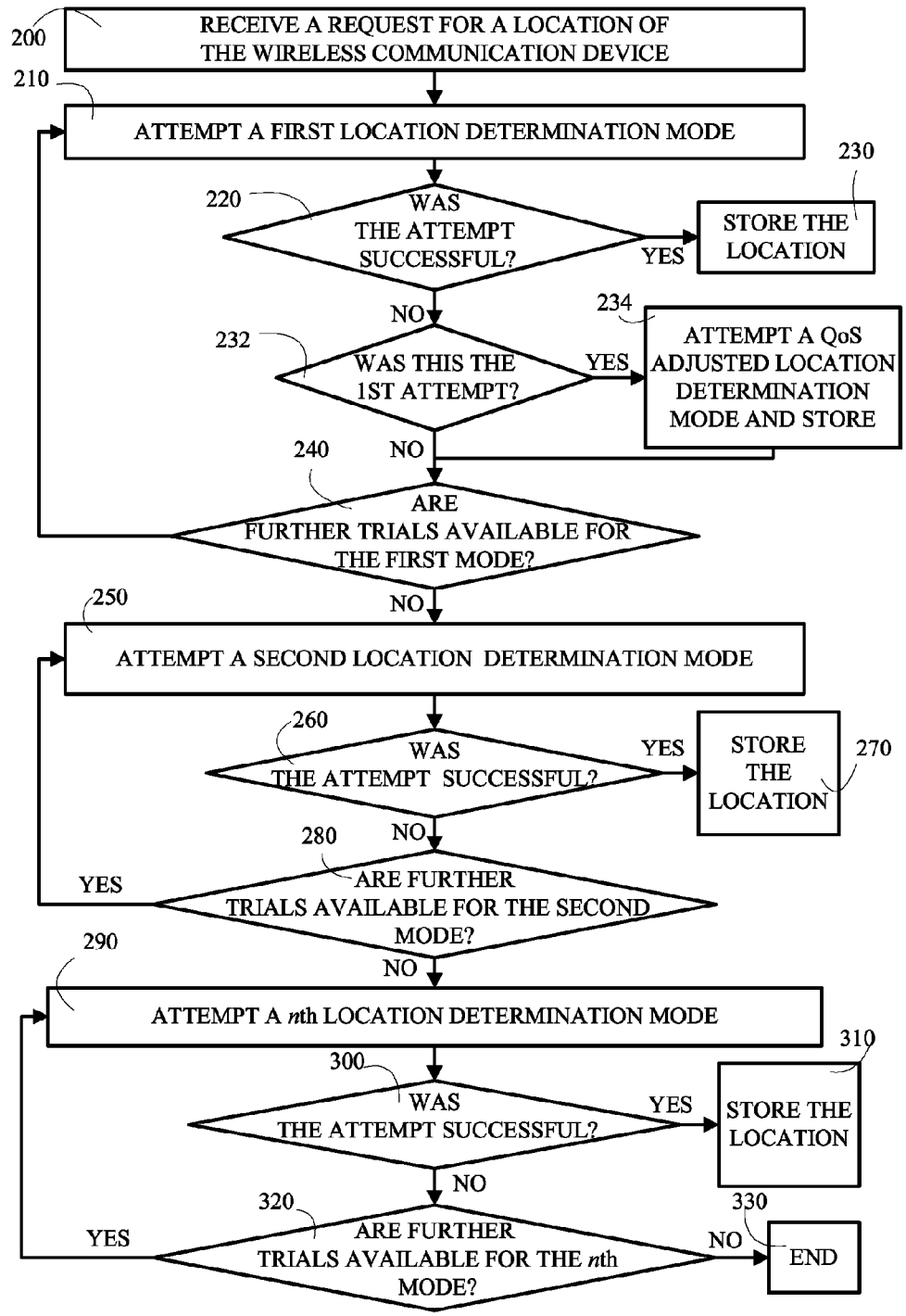
FIG. 7 is a flow diagram of a method for location determination in a wireless device that provides for attempting a QoS adjusted mode following the first attempt of another location determination mode from amongst a sequence of mode attempts, according to an aspect.
Figure 8:
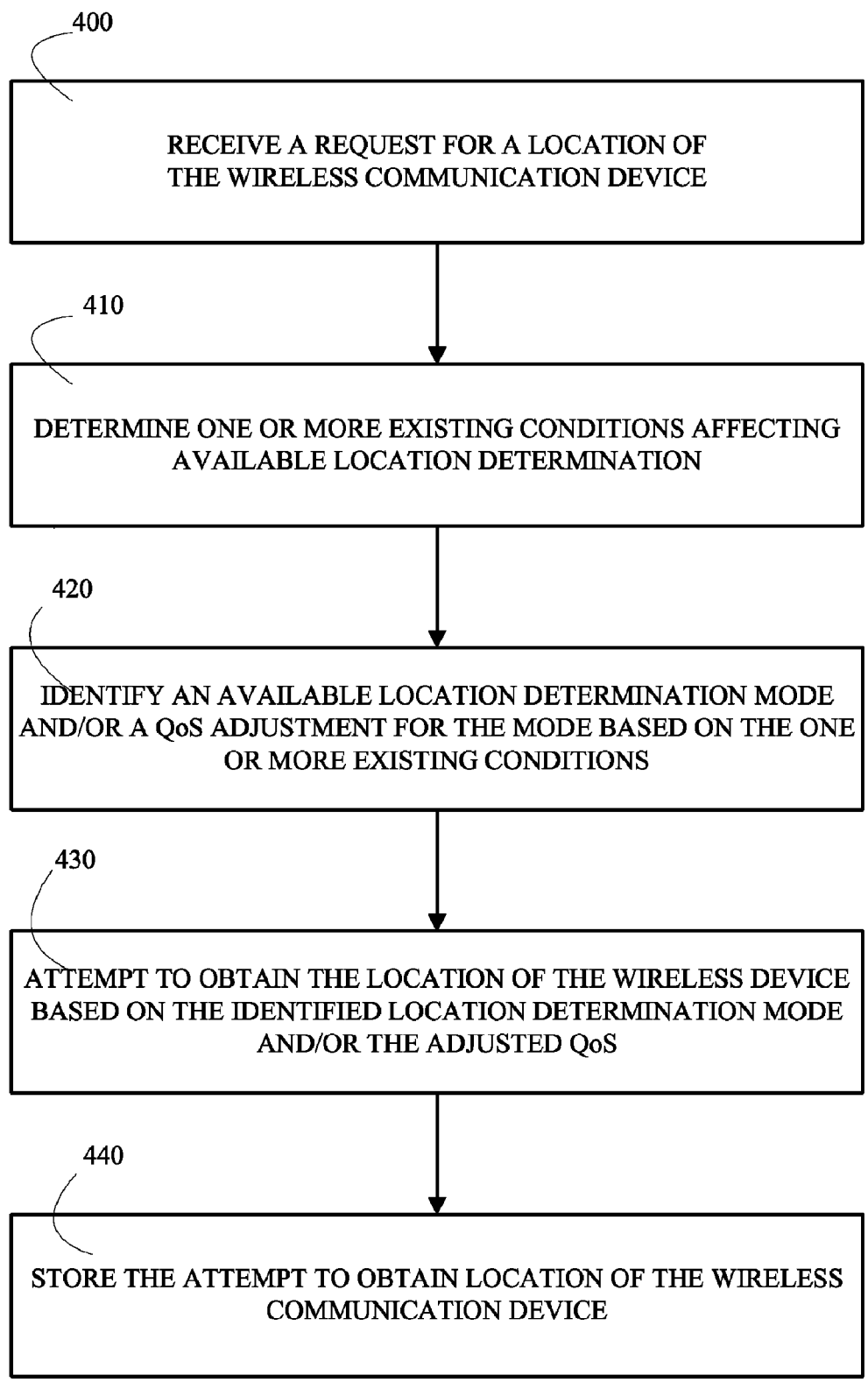
FIG. 8 is a flow diagram of a method for location determination in a wireless device that provides for determining one or more conditions affecting available location determination modes and selecting an available mode and/or adjusting QoS based on the existing conditions, according to an aspect.

As illustrated in the methods discussed in relation to FIGS. 7 and 8 infra, in some aspects, the mode routine 2 may provide for sequencing through multiple trials, allowing for multiple attempts within a given trial and determining, within one or sequenced trials, one or more existing conditions that affect location determination.

Figure 9:
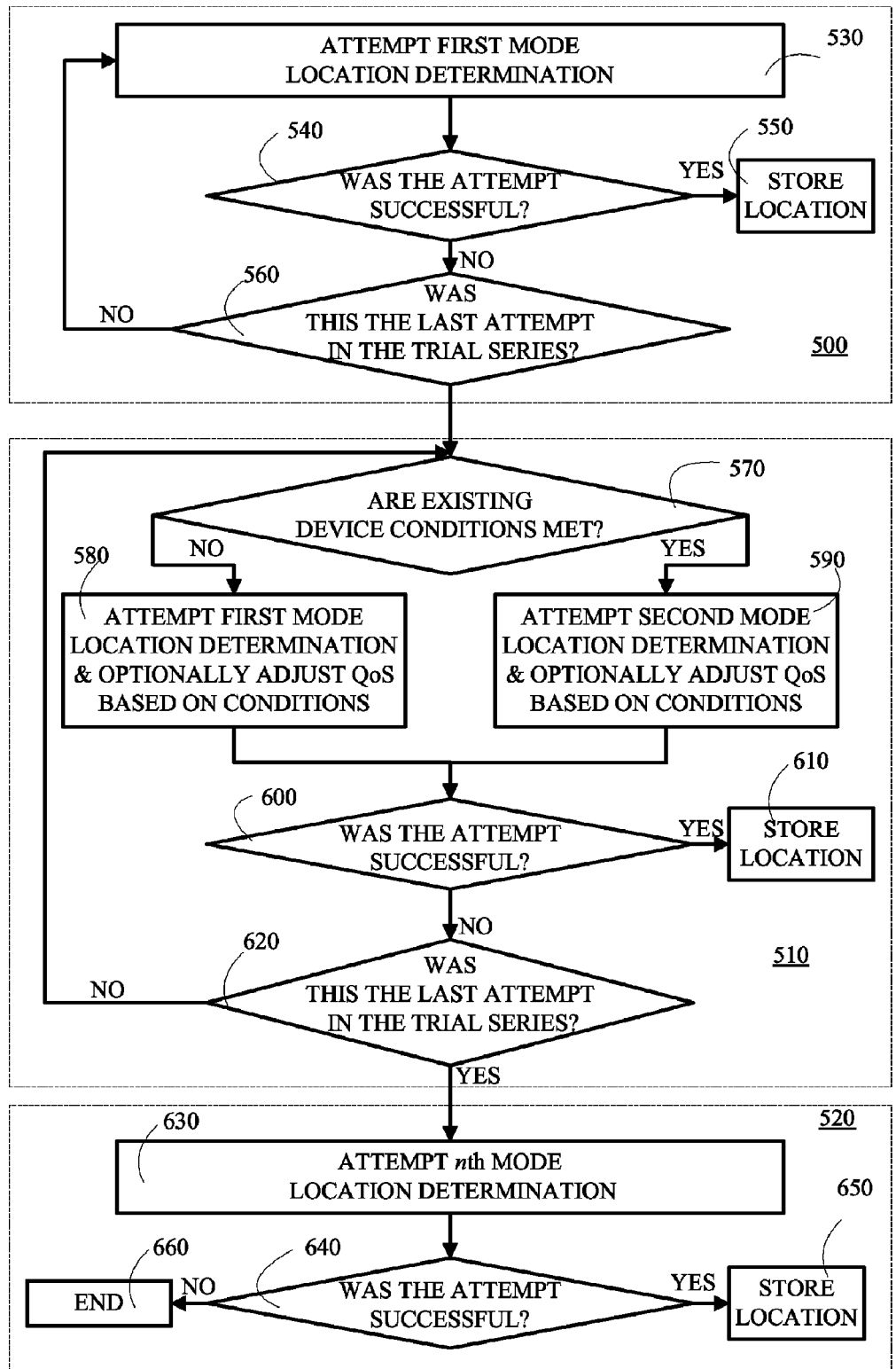
FIG. 9 is a flow diagram illustrating a specific method for location determination in a wireless device in which multiple trials are conducted in sequence of which one or more trials determine one or more conditions affecting available modes and selects an available mode and/or adjusts QoS based on the conditions; according to an aspect.
Figure 10:
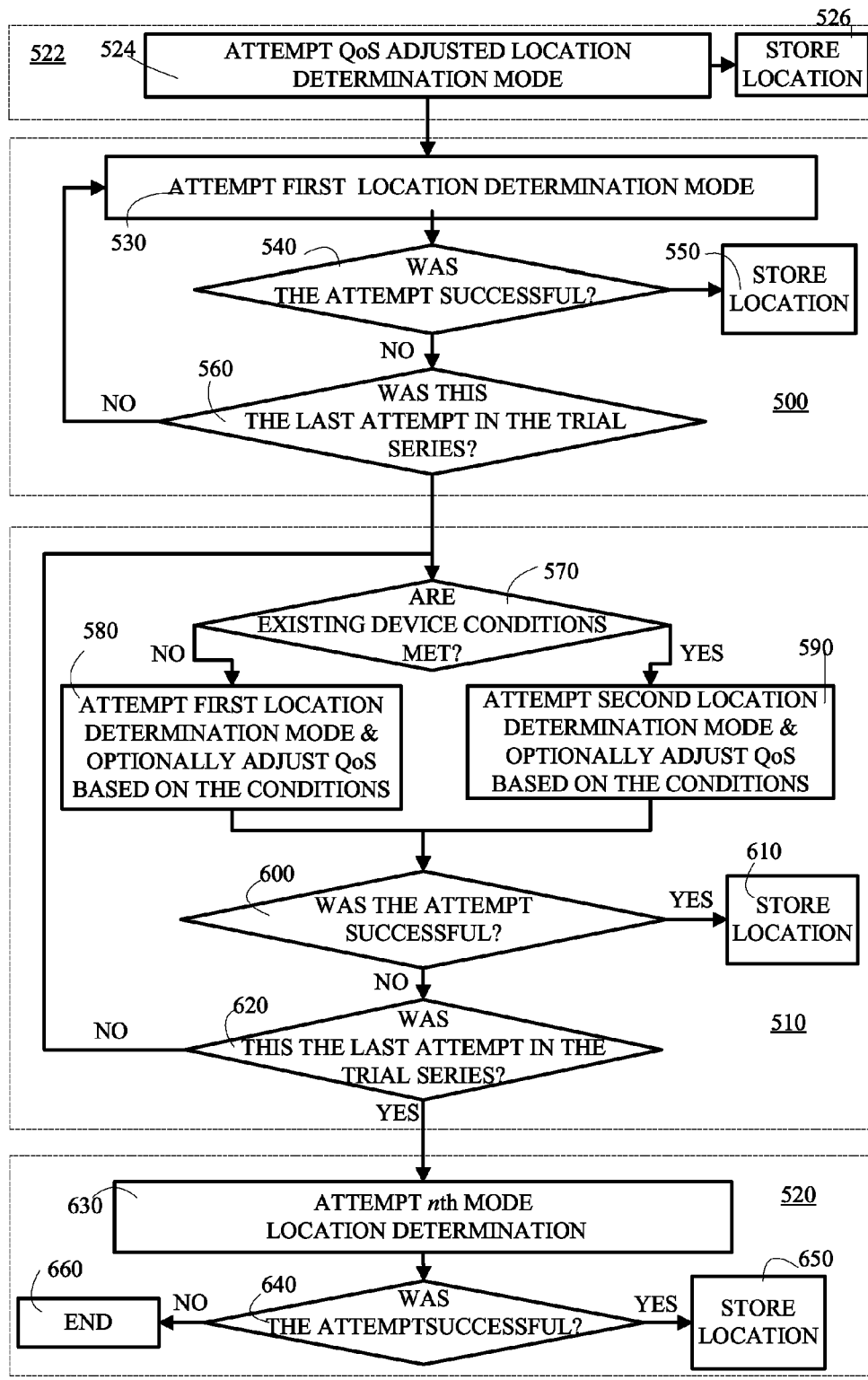
FIG. 10 is a flow diagram illustrating a specific method for location determination in a wireless device in which a preliminary QoS adjustable location determination mode is attempted followed by multiple trials conducted in sequence of which one or more of the trials determine one or more conditions affecting available modes and selects an available mode and/or QoS adjustment based on the conditions, according to an aspect.
Figure 11:
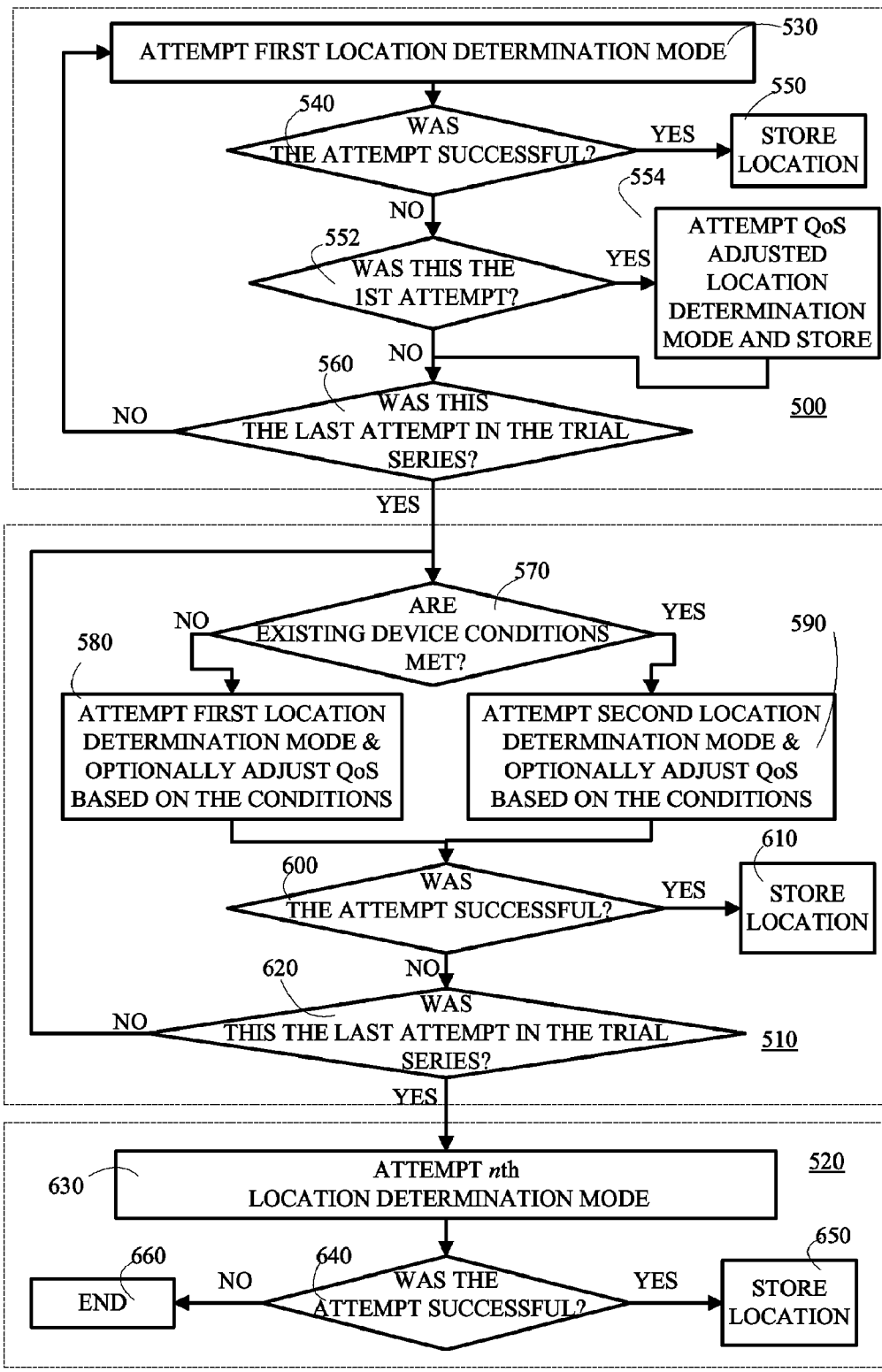
FIG. 11 is a flow diagram illustrating a specific method for location determination in a wireless device that provides for attempting a QoS adjustable location determination mode after the first attempt of the first trial from amongst a plurality of trails conducted in sequence of which one or more of the trials determine one or more conditions affecting available modes and selects an available mode and/or QoS adjustment based on the conditions, according to an aspect.

In additional aspects, as discussed in relation to FIGS. 9-11, mode routine 2 may be configured to sequence through multiple trials that implement one or more location determination modes 4 to attempt to successfully determine a location 36. In such aspects, the mode routine may additionally include one or more location determination modes 4 having an adjustable QoS parameter 6 that may be adjusted based on a preconfiguration of the routine 2 or may be adjusted based on existing and/or historical conditions. In one specific aspect, location determination mode 4 having an adjustable QoS is implemented after the first unsuccessful attempt within the primary trial of the mode routine 2, such that the QoS of the mode is adjusted lower In other aspects, mode routine 2 may be configured to determine historical existing conditions that affect location determination and select a mode and/or, in some instances determine whether QoS should be adjusted for that mode and, if so the level of QoS adjustment necessary. As such, memory 24 may include a historical conditions database 71 that stores historical data related to network conditions, wireless device locations, environmental conditions and the like. As such, historical conditions database 71 may be in communication with one or more of the wireless signal monitor 62, voice call module 64, data call module 66, battery monitor 68 other environmental condition modules 70 or the like to monitor and record historical conditions. The QoS adjuster 8 may continually monitor the historical conditions database 71 to adaptively adjust QoS parameters 6 based on the overall historical condition data and/or patterns or trends in the historical condition data. In addition, the historical conditions database 71 may be accessed on a per location request basis to determine the current historical status prior to initiating the routine 2 or prior to initiating one or more modes 4 within the routine 2.

Additionally, wireless communication device 10 has input mechanism 72 for generating inputs into communication device, and output mechanism 74 for generating information for consumption by the user of the communication device. For example, input mechanism 72 may include a mechanism such as a key or keyboard, a mouse, a touch-screen display, a microphone, etc. In certain aspects, the input mechanisms 72 provides for user input to interface with an application, such application 44 to initiate a location determination request. Further, for example, output mechanism 74 may include a display, an audio speaker, a haptic feedback mechanism, etc. In the illustrated aspects, the output mechanism 108 may include a display operable to display an application interface for requesting location determination or a map that provides a determined device location.

Figure 4:
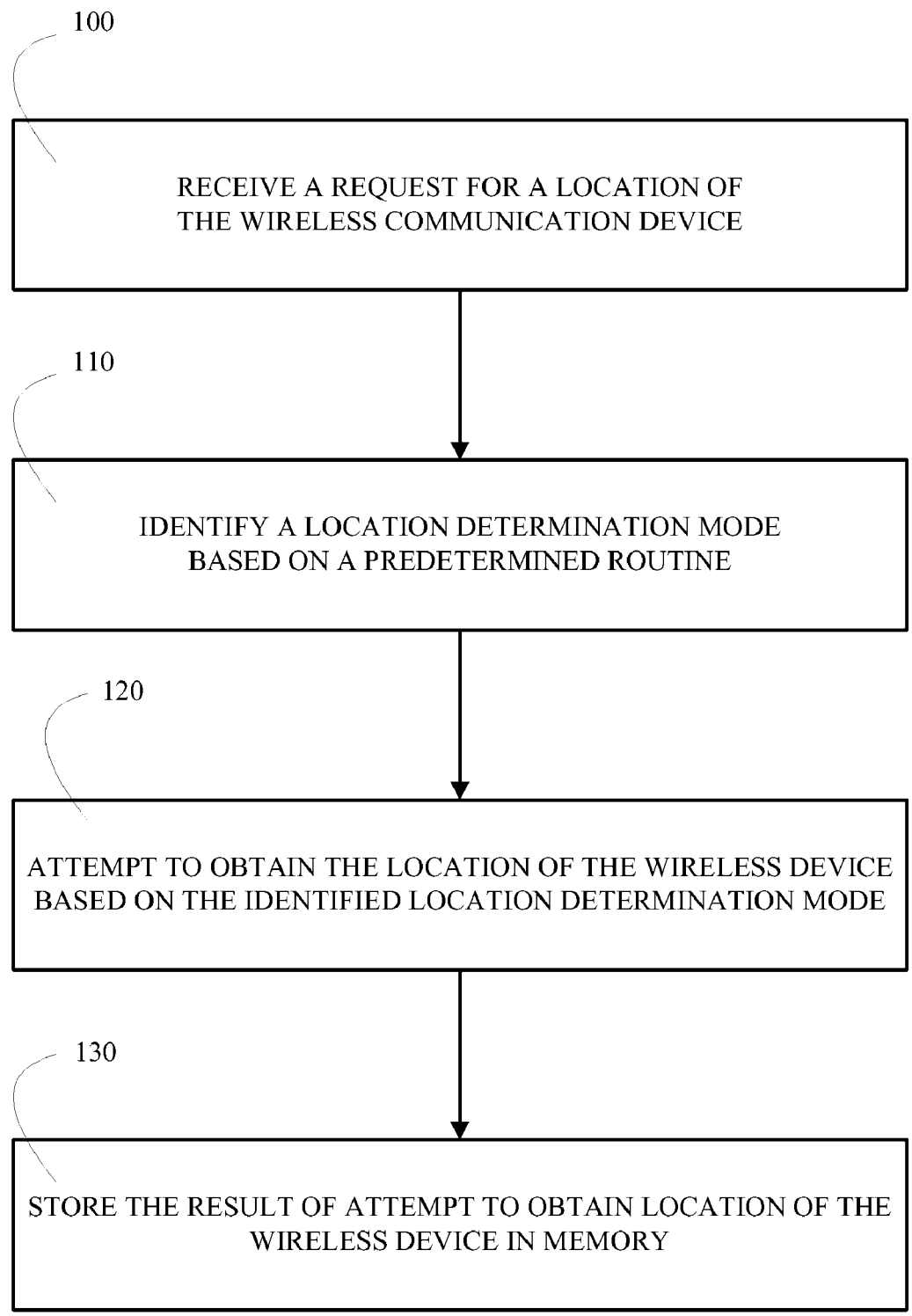
FIG. 4 is a flow diagram of a method for location determination in a wireless communication device, according to another aspect.

Referring to FIG. 4, a flow diagram is presented of a method for determining the location of a wireless communication device. At Event 100, a request for location determination is received. The request may be an internal request received from an application that requires location determination, such as a mapping application, a performance diagnostic application or the like, or the request may be an external requested received wirelessly from a network device or entity.

At Event 110, at least one location determination mode is identified based on a predetermined routine. It should be noted that in some instances, the wireless device may only have one available location determination mode, in which case the only available mode will be identified mode as determined by the mode routine. As previously noted, in some aspects, identifying a location determination mode may include sequencing through multiple trials and allowing for multiple location determination attempts within a given trial, and/or determining one or more existing conditions that affect location determination and selecting a mode based on the determined existing conditions. In addition, one or more of the identified modes may have an adjustable QoS parameter. The adjustable QoS parameter may be preconfigured by the predetermined routine or the QoS parameter may be adjusted based on existing conditions that temporal with the execution of the mode.

In one specific aspect in which the wireless device has only one available location determination mode, the mode routine may determine existing conditions and, based on the existing conditions, a determination may be made as to whether to attempt the available mode. Additionally, in aspects in which the predetermined routine includes only one mode, the one mode may have an adjustable QoS parameter that is operable to be adjusted based on the existing conditions that exist temporal with the execution of the mode.

In other aspects, the mode routine may determine existing conditions and, based on the existing conditions, determine the best mode from among a plurality of available location determination modes or determine a best sequence for the modes.

At Event 120, the identified mode attempts to obtain the location of the wireless communication device. In some aspects, the selected mode may be attempted numerous times until a successful location determination results. In other aspects, such as when mode sequencing is implemented, multiple modes may be selected and executed until a successful location determination results. It should also be noted that in some instances, execution of the selected mode or selected modes might result in a failure to determine a location. In certain instances, in which specific conditions exist, failure to determine a location may be an acceptable result of the location determination process to insure the integrity of other device functions, such as voice call or data call quality, battery power consumption and the like. In those aspects in which the mode routine includes one or more location determination modes having an adjustable QoS parameter, successful location determination at an adjusted QoS level may not prohibit further attempts to obtain a location fix based on another mode or an attempt of the location determination mode having the adjustable QoS parameter at a higher or lower QoS.

At Event 130, the result of the attempt to obtain location of the wireless device is stored in memory. Storing the result of the attempt to obtain location in memory may involve returning the location to the internal application that requested location determination and storing the location within the application or storing the result of the attempt to obtain location in memory may involve communicating the location to the network device/entity that requested location determination and, subsequently, remotely storing the location in a network database.

Referring now to FIG. 5, a flow diagram is depicted of a method for location determination in which the mode routine selects the mode based on sequencing through multiple trials and allowing for multiple attempts within a given trial, in accordance with a specific aspect. At Event 200, a request for location determination is received. As previously noted, the request may be an internal request received from an application or the request may be an external requested received from a network device/entity. At Event 210, an attempt is made to determine location using a first location determination mode. In the illustrated aspect of FIG. 5, the first location determination mode is the first mode in a sequence of modes and defines the first trial. The sequence order may be determined based on various factors that affect the efficiency and effectiveness of the location determination process, as well as the effectiveness of other applications and features being executed on the wireless device.

At Event 220, a determination is made as to whether the attempt was successful in determining the location of the device. If the attempt to determine location was successful then, at Event 230, the location is stored, either in an internal database or in an external database, such as a network database. If the attempt to determine location was not successful then, at Event 240, a determination is made as whether additional attempts are available for the first trial. In this regard, the mode routine may be configured to provide for more than one attempt for a given trial. For example, the mode routine may be configured to provide for three attempts using the first location determination mode before sequencing to the second location determination mode. If additional attempts are available for the first trial, the routine will return to Event 210 and an additional attempt is made using the first location determination mode.

If no further attempts are available for the first trial then, at Event 250, the routine will sequence to the second location determination mode and an attempt is made to determine location using the second location determination mode. At Event 260, a determination is made as to whether the attempt was successful in determining the location of the device. If the attempt to determine location was successful then, at Event 270, the location is stored, either in an internal database or in an external database, such as a network database. If the attempt to determine location was not successful then, at Event 280, a determination is made as whether additional attempts are available for the second trial. If additional attempts are available for the second trial, the routine will return to Event 250 and an additional attempt is made using the second location determination mode.

The sequencing through trials to determine a location continues until the last trial in the sequence is encountered. In the illustrated aspect of FIG. 5, the last trial in the sequence, the nth trial as defined by the nth location determination mode. The nth trial may be the second trial in the sequence or any subsequent trial in the sequence. If no further attempts are available for the second trial then, at Event 290, the routine will sequence to the nth trial and an attempt is made to determine location using the nth location determination mode. At Event 300, a determination is made as to whether the attempt was successful in determining the location of the device. If the attempt to determine location was successful then, at Event 310, the location is stored, either in an internal database or in an external database, such as network database. If the attempt to determine location was not successful then, at Event 320, a determination is made as whether additional attempts are available for the nth trial. If further attempts are available for the nth trial the routine returns to Event 290 and an additional attempt is made using the nth mode. If no further attempts are available then, at Event 330, the location determination process ends, in this instance, without having successfully determined a location.

In alternate aspects, the mode routine may include a single location determination mode. In which case, steps 250-330 of FIG. 5 would not be required. By way of example, single location determination mode may be implemented if the device only accommodates a single mode of location determination.

Figure 6:
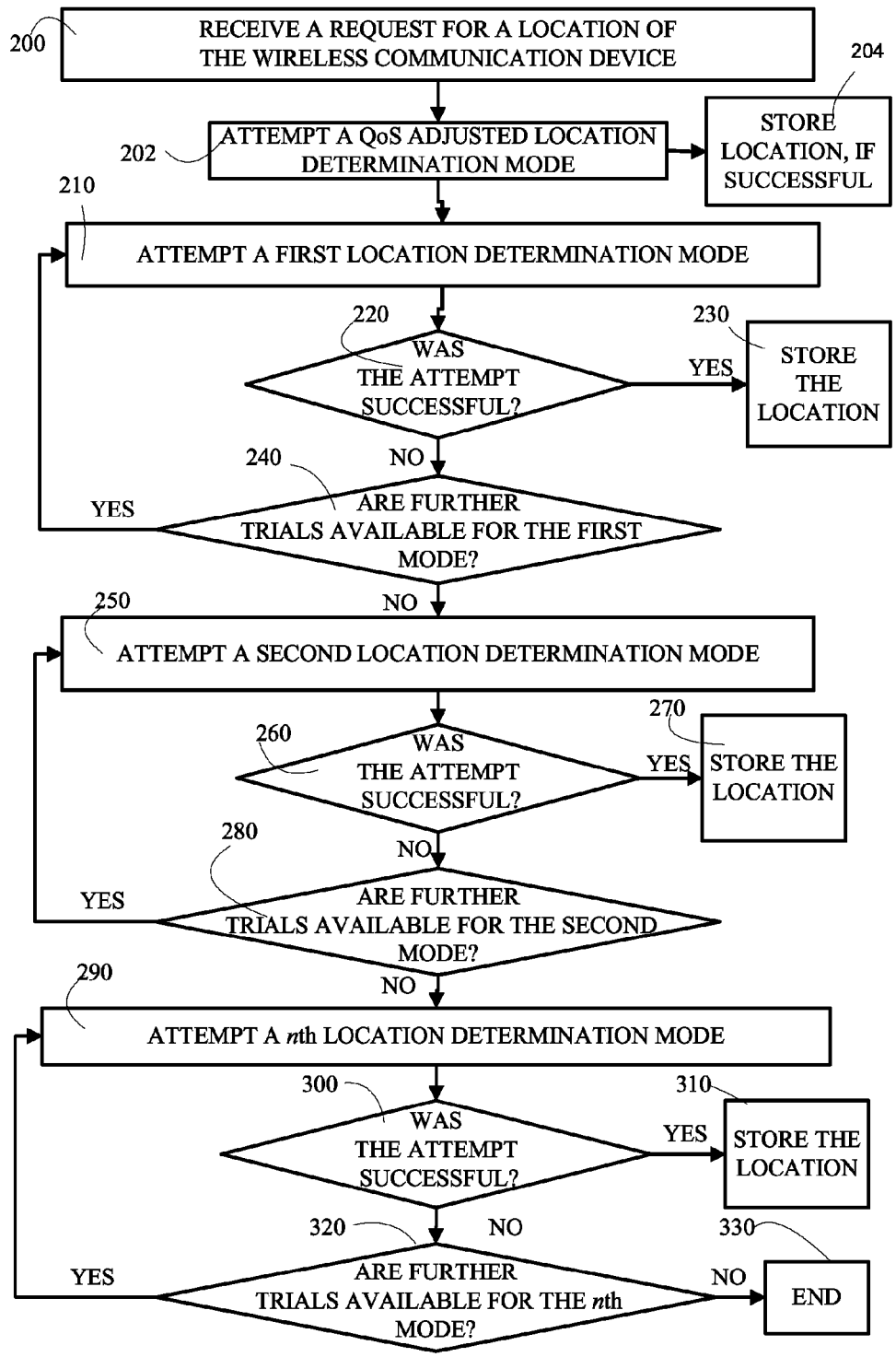
FIG. 6 is a flow diagram of a method for location determination in a wireless device that provides for attempting a preliminary QoS adjustable location determination mode followed by sequencing through a plurality of other modes in an attempt to determine a location, according to an aspect.

Referring to FIG. 6, a flow diagram is depicted of a specific aspect of a method of location determination in which the location determination routine implements location determination mode in which the QoS is adjusted in an attempt to obtain a location fix. Once the QoS adjustable location determination mode is attempted, the routine follows by sequencing through multiple trials that are each associated with a separate location determination mode and allowing for multiple attempts within a given trial. The flow presented in FIG. 6 is identical to the flow presented in FIG. 5 with the exception of Events 202 and 204. Therefore, the discussion of the flow of FIG. 6 will be limited to a discussion of the additional Events 202 and 204.

Once the wireless device has received a request for location determination (Event 200), at Event 202, the mode routine will attempt a location determination mode in which the QoS parameter is or has been adjusted. The QoS may be adjusted based on a preconfigured value of adjustment in the location determination routine, or the QoS may be dynamically adjusted based on existing conditions or historical conditions, or the QoS may have been adjusted adaptively based on the monitoring of historical conditions. In one specific aspect, the location determination mode in which the QoS parameter is adjusted is further defined as MS-Assisted mode. In such an aspect, the QoS parameter associated with MS-Assisted mode may be adjusted down or lowered such that a minimal search time is provided for locating the satellite signals. In this scenario, the MS-Assisted mode is likely to return a network-based location determination. In the aspect illustrated by FIG. 6, lowering the QoS level of MS-Assisted mode for location attempt at Event 202 generally provides for a fast means of returning a network-based location determination. While the network-based location determination may not be as accurate as a satellite-based location determination that is subsequently returned by the routine, the network-based location determination may be relied on and used by the requesting application if the subsequent satellite-based modes fail to return a location determination. At Event 204, the wireless device will store the location fix associated with the QoS adjustable location determination mode, if the attempt was successful. It should be noted that while not depicted in FIG. 6, it may be possible to implement further QoS adjustable location determination modes at any point throughout the sequence of the multiple location determination trials, if, for example the initial attempt of the QoS adjustable location determination mode fails.

FIG. 6 also illustrates that after the preliminary QoS adjustable location determination mode attempt (Event 202), in some aspects, the flow will continue regardless of whether the QoS adjusted location determination is successful or unsuccessful. As such, the flow continues to Event 210 and an attempt is made to determine fix based on the first location determination mode. The first location determination mode will typically be a non-QoS adjusted mode, however, as previously noted it may also provide for QoS adjustment. Thus, a successful location determination while implementing the first, second or nth satellite-based location determination mode will result in the completion of the location determination process, a successful initial QoS adjusted location determination fix, based on the QoS level being adjusted to a lower or minimum level, may not necessarily prohibit the need to conduct additional location determinations to render a more accurate satellite-based location determination Additionally, as noted in relation to FIG. 5, in alternate aspects, the mode routine may include a single QoS adjustable location determination mode or a single QoS adjustable location determination mode and a first location determination mode. In the first instance, steps 210-330 of FIG. 6 would not be required and in the later instance, steps 250-330 of FIG. 6 would not be required.

Referring to FIG. 7, a flow diagram is depicted of a specific method aspect for location determination in which the mode routine implements a QoS adjustable location determination mode in an attempt to obtain a network-based location fix during the trails related to a first location determination mode. In this regard, the QoS adjustable location determination mode may be attempted after at least one other mode has been attempted and failed. Once the QoS adjustable location determination mode is attempted, the routine follows by attempting any further trials related to the first location determination mode and sequencing through various other trials that each are associated with a separate location determination mode. It should be noted that in some aspects, the QoS adjustable location determination mode may be attempted after initiating the first location determination mode but prior to receiving the result (i.e., in sequence), such as during a time period when the wireless device is waiting for the first location determination mode fix. The flow presented in FIG. 7 is identical to the flow presented in FIG. 5 with the exception of Events 232 and 234. Therefore, the discussion of the flow of FIG. 7 will be limited to a discussion of the additional Events 232 and 234.

If the attempt of the first location determination mode is unsuccessful (Event 220) then, at Event 232, a determination is made as whether the attempt was the first attempt for the first location determination mode. If is determined that it was the first attempt of the first satellite-based location determination mode then, at Event 234, the mode routine attempts a QoS adjustable location determination mode such, such as MS-Assisted Mode or the like in which the QoS is lowered, such as to a minimum level, to insure that searching time only provides for recording of network parameters and a network-based location determination fix is returned. If the QoS adjustable location determination mode attempt is successful, the related location fix is stored in device memory. It should be noted that while not depicted in FIG. 7, it may be possible to implement further QoS adjustable location determination modes, after or during any other trials in the sequence of trials related to the first, second or nth satellite-based location determination, if the initial attempt for a QoS adjusted location determination fails. In the illustrated aspect, the QoS adjustable location determination mode attempt is attempted the closest in time to the initial first location determination mode attempt to insure the timeliness of the network parameters used to determine the QoS adjusted location determination fix.

Similar to the flow of FIG. 6, FIG. 7 also illustrates that in some aspects, after the QoS adjustable location determination mode attempt (Event 234), the flow may continue regardless of whether the QoS adjusted location determination is successful or unsuccessful. In this instance, the flow continues to Event 240 and a determination is made as to whether further first location determination mode trails are available or, if no further trials are available, the mode routine attempts a second location determination mode. Thus, while a successful location determination while implementing the first, second or nth location determination mode will result in the completion of the location determination process, a successful QoS adjusted location determination fix based on the QoS level being adjusted lower, may not necessarily prohibit the need to conduct additional location determinations to render a more accurate satellite-based location determination Additionally, as noted in relation to FIG. 5, in alternate aspects, the mode routine may include a single QoS adjustable location determination mode and a single first location determination mode. In this instance, steps 250-330 of FIG. 7 would not be required Referring to FIG. 8, a flow diagram is depicted of a method for location determination in which the mode routine determines existing conditions that affect location determination and selects the mode based on the determined existing conditions and/or adjusts QoS levels for one or more QoS adjustable modes, in accordance with a specific aspect. At Event 400, a request for location determination is received. As previously noted, the request may be an internal request received from an application, or the request may be an external requested received from a network device/entity. At Event 410, the wireless device determines one or more existing conditions affecting location determination. Examples of existing conditions include, but are not limited to, current wireless signal state, such as Code Division Multiple Access (CDMA) signal state or Global System for Mobile (GSM) communications signal state, Universal Mobile Telecommunications System (UMTS) signal state, Wireless Fidelity (Wi-Fi) signal state, Worldwide Interoperability for Microwave Access (WiMAX) signal state, current state of information communicated from the PDE, such as ephemeris data, almanac data and the like, current communications state, such as voice call state, data session state or the like, current battery power state, current environmental condition(s) state, such as visibility or received signal strength of the satellites, and any other existing conditions which may affect location determination.

At Event 420, a location determination mode is identified and/or a QoS adjustment is determined based on the one or more existing conditions. For example, if the existing condition is defined as the current state of the wireless signal, the routine may choose to apply the MS-Based mode if no wireless signal is currently available and choose the MS-Assisted mode if a wireless signal is available. If the MS-Assisted mode is selected based on existing conditions, the routine may further determine to adjust the QoS based on existing conditions, such as the current ability to receive satellite signals. In instances in which more than one existing condition is determined and used in the selection of a mode, each of the conditions may be considered in a prioritized series of selection of the mode determinations, each of the plurality of conditions may be weighted based on significance of the condition and an appropriate weighted algorithm applied to select a mode or any other logical decision making routine may be implemented based on the plurality of conditions used to determine a mode. In addition to selecting a mode based on existing conditions and determining QoS adjustment based on existing conditions, the method may also provide for suspending or delaying the implementation of a mode based on an existing condition. For example, if the condition is defined as the current state of a voice or data call, the routine may be configured to delay or otherwise suspend the execution of the location determination mode and/or the routine.

In one specific aspect in which the wireless device has only one available location determination mode, the mode routine may determine existing conditions and, based on the existing conditions, a determination may be made as to whether to attempt the available mode. In addition, if the determination is made to attempt the mode, a further determination of QoS adjustment for the mode may be made based on the existing conditions. In other aspects, the mode routine may determine existing conditions and, based on the existing conditions, determine the best mode from among a plurality of available location determination modes or determine a best sequence for the modes.

Additionally, in one specific aspect, the mode routine may select one or more location determination modes based on existing conditions and implement one or more QoS adjustable location determination modes. The QoS adjustable location determination modes may have the QoS adjusted based on any suitable adjustment criteria, for example, preconfiguration of the routine, existing conditions and/or historical condition data. For example, in one specific aspect, the mode routine may sequence through multiple trails that implement various location determination modes, one or more of the sequence of trials may rely on existing conditions to select the location determination mode for the trail. In addition, the specific aspect may include attempting a QoS adjustable location determination mode either prior to the trials or during a pause in one of the trial attempts, such as during pause after the initial attempt in the first or primary trial.

At Event 430, the identified mode attempts to obtain the location of the wireless communication device and in some aspects, the attempt is based on an adjusted QoS value dictated by the existing conditions. As previously noted, in some instances, execution of the selected mode or selected modes may result in a failure to determine a location. As previously noted, in those aspects in which the mode routine includes both QoS adjustable location determination mode, and specifically, a mode in which the QoS is lowered, successful QoS adjusted location determination will generally not prohibit further attempts to obtain a location fix based on a another location determination mode.

At Event 440, the result of the attempt to determine location of the wireless device is stored in memory. As previously noted, storing the result of the attempt to determine location in memory may involve returning the location to the internal application that requested the location storing the location internally or storing the result of the attempt to determine location in memory may involve communicating the location to the network device/entity that requested location determination and, subsequently, remotely storing the location in a network database. In those aspects in which both a QoS adjusted location fix and another location fix result, the more accurate location fix may be the permanently stored and/or the reported fix or the more accurate location fix may be stored or reported as the prioritized location fix.

FIG. 9 is a flow diagram illustrating a specific method for location determination in which the mode routine sequences through multiple trials, may attempt location determination within a sequenced trial multiple times, determines existing conditions, which affect location determination within a specified trial and selects the mode and/or, optionally, adjusts the QoS based on the determined existing conditions, in accordance with an aspect. The illustrated aspect provides for nth trials for mode selection. The first trial 500 selects a first location determination mode and may attempt the trial more than one time before moving to the second trial. The second trial 510 selects either the first or second location determination mode and/or, optionally adjusts the QoS based on the determined existing condition(s) and may attempt the trial more than one time before moving to the third trial. The nth trial 520 selects an nth location determination mode and attempts the mode one time, if the attempt of the nth mode is not successful the routine is ended and no location determination results.

It should be noted that the nth trial example of FIG. 9 is by way of example only. The mode routine could be configured with a single first trial, implementing one or more attempts and having one or more modes selected and/or, optionally, adjust the QoS based on existing conditions. For example, in a single first or primary trial aspect, prescribed conditions may need to be met in order to proceed with the trial. In such aspects, Events 570-660 or Events 530-560 and 630-660 of FIG. 9 may be omitted.

At Event 530, an attempt is made to determine location using a first location determination mode. At Event 540, a determination is made as to whether the attempt was successful in determining the location of the device. If the attempt to determine location was successful then, at Event 550, the location is stored, either in an internal database or in an external database, such as network database. If the attempt to determine location was not successful then, at Event 560, a determination is made as whether additional attempts are available for the first trial. In this regard, the mode routine may be configured to provide for more than one attempt for a specified trial. If additional attempts are available for the first trial, the routine will return to Event 530 and an additional attempt is made using the first location determination mode.

If no further attempts are available for the first trial then, at Event 570, the routine will sequence to the second trial 510 and a determination is made as to whether existing conditions that affect location determination are met. For example, the defined existing condition may be the current state of the wireless signal or any other condition that affects location determination. If the conditions are not met, at Event 580, an attempt is made to determine location using the first location determination mode and, optionally, the QoS for the attempt is adjusted based on the existing conditions. It should be noted that the specific use of the first mode is not required; any other available mode may be used if the existing conditions are not met. If the existing conditions are met then, at Event 590, an attempt is made to determine location using a second location determination mode and, optionally, the QoS for the attempt is adjusted based on the existing conditions.

At Event 600, a determination is made as to whether the attempt was successful in determining the location of the device. If the attempt to determine location was successful then, at Event 610, the location is stored, either in an internal database or in an external database, such as a network database. If the attempt to determine location was not successful then, at Event 620, a determination is made as to whether additional attempts are available for the second trial. If additional attempts are available for the second trial, the routine will return to Event 570 and determine if existing conditions are met prior to choosing the mode that will be used to attempt to determine location and, optionally determine if QoS adjustment is warranted and, if so, the level of adjustment.

If no further trials are available for the second trial then, at Event 630, the routine will sequence to the nth trial 520 and an attempt is made to determine location using the a nth mode. At Event 640, a determination is made as to whether the attempt was successful in determining the location of the device. If the attempt to determine location was successful then, at Event 650, the location is stored, either in an internal database or in an external database, such as network database. If the attempt to determine location was not successful then, at Event 660, the location determination process ends, in this instance, without having successfully determined a location. As previously noted, the nth trial 520 in the illustrated aspect of FIG. 7 is configured to provide for one attempt of the nth location determination mode. Additionally, while the illustrated nth trail does not select a mode based on existing conditions, any nth trial can be configured to select a mode based on existing conditions and, optionally adjust QoS based on the existing conditions.

Referring now to FIG. 10, a flow diagram is depicted of a specific method aspect for location determination in which the mode routine implements a preliminary QoS adjustable location determination mode in an attempt to obtain a location fix. Once the QoS adjustable location determination mode is attempted, the routine sequences through multiple trials, may attempt location determination within a sequenced trial multiple times, determines existing conditions, which affect location determination and optionally QoS adjustment within a specified trial and selects the location determination mode and, optionally QoS adjustment based on the determined existing conditions. The flow presented in FIG. 10 is identical to the flow presented in FIG. 9 with the exception of preliminary trial 522 and Events 524 and 526. Therefore, the discussion of the flow of FIG. 10 will be limited to a discussion of the preliminary trail 522 and the additional Events 524 and 526.

In addition to the first trial 500, the second trial 510 and the nth trial 520, the illustrated method of FIG. 10 includes a preliminary trial 522. The preliminary trial provides for a QoS adjustable location determination mode to be attempted prior to the first, second and nth trials. At Event 524, the mode routine will attempt a preliminary QoS adjustable location determination mode such, such as a MS-Assisted Mode configured to make a network-based location determination in addition to a satellite based location determination. As previously noted the adjustment to the QoS may be based on preconfiguration of the location determination routine, existing conditions and/or historical conditions. At Event 526, the wireless device will store the QoS adjusted location fix, if the attempt was successful. It should be noted that while not depicted in FIG. 10, it may be possible to implement further QoS adjustable location determination modes prior to the beginning of the first trial 500 or at any point throughout the sequence of the multiple satellite-based location determination trials 500, 510 and/or 520, if the initial attempt for a QoS adjusted location determination fails.

FIG. 10 also illustrates that after the preliminary QoS adjustable location determination mode attempt (Event 522), the flow will continue regardless of whether the QoS adjusted location determination is successful or unsuccessful. As such, the flow continues to Event 530 and an initial first mode location determination attempt occurs. Thus, while a successful location determination while implementing the first, second or nth location determination modes may result in the completion of the location determination process, a successful QoS adjusted location determination fix, based on lowering the QoS, such as to a minimum level, may not prohibit the need to conduct additional location determinations to render a more accurate location determination.

Additionally, as noted in relation to FIG. 9, in alternate aspects, the mode routine may include a single first location determination mode or first trial. In which case, Events 570-660 or Events 530-560 and 630-660 of FIG. 10 would not be required.

Referring to FIG. 11, a flow diagram is depicted of a specific method aspect for location determination in which the mode routine implements a QoS adjustable location determination mode in an attempt to obtain a location fix after the first attempt of the first trail related to a first location determination mode. In this regard, the QoS adjustable location determination mode is attempted after at least one other mode has been attempted and failed. Once the QoS adjustable location determination mode is attempted, the routine continues to sequence through multiple trials, may attempt location determination within a sequenced trial multiple times, determines existing conditions, which affect location determination within a specified trial and optionally, may affect QoS adjustment and selects the location determination mode and, optionally, QoS adjustment based on the determined existing conditions. The flow presented in FIG. 11 is identical to the flow presented in FIG. 9 with the exception of Events 552 and 554. Therefore, the discussion of the flow of FIG. 11 will be limited to a discussion of the additional Events 552 and 554.

If the attempt of the first location determination mode is unsuccessful (Event 540) then, at Event 552, a determination is made as whether the attempt was the first attempt for the first location determination mode. If is determined that it was the first attempt of the first location determination mode then, at Event 554, the mode routine attempts a QoS adjustable location determination mode such, such as MS-Assisted mode configured to record the current network parameters and obtain a network-based location fix in addition to a satellite-based fix. If the QoS adjusted location determination is successful, the location fix is stored in device memory. It should be noted that while not depicted in FIG. 11, it may be possible to implement further QoS adjustable location determination modes, after any other trials in the sequence of trials related to the first, second or nth location determination, if the initial attempt for a QoS adjusted location determination fails. In the illustrated aspect, the QoS adjusted location determination attempt is attempted the closest in time to the initial first location determination mode attempt to insure the timeliness of the measurement data used to determine the QoS adjusted location fix.

Similar to the flow of FIG. 10, FIG. 11 also illustrates that after the QoS adjustable location determination mode attempt (Event 554), the flow will continue regardless of whether the QoS adjusted location determination is successful or unsuccessful. In this instance, the flow continues to Event 56 and a determination is made as to whether further first location determination mode trails are available or, if no further trials are available, the mode routine continues to the second trial 510 and, at Event 570, determines if existing device conditions are met.

Additionally, as noted in relation to FIG. 9, in alternate aspects, the mode routine may include a single first location determination mode. In which case, Events 570-660 or Events 530-560 and 630-660 of FIG. 11 would not be required.

Figure 12:
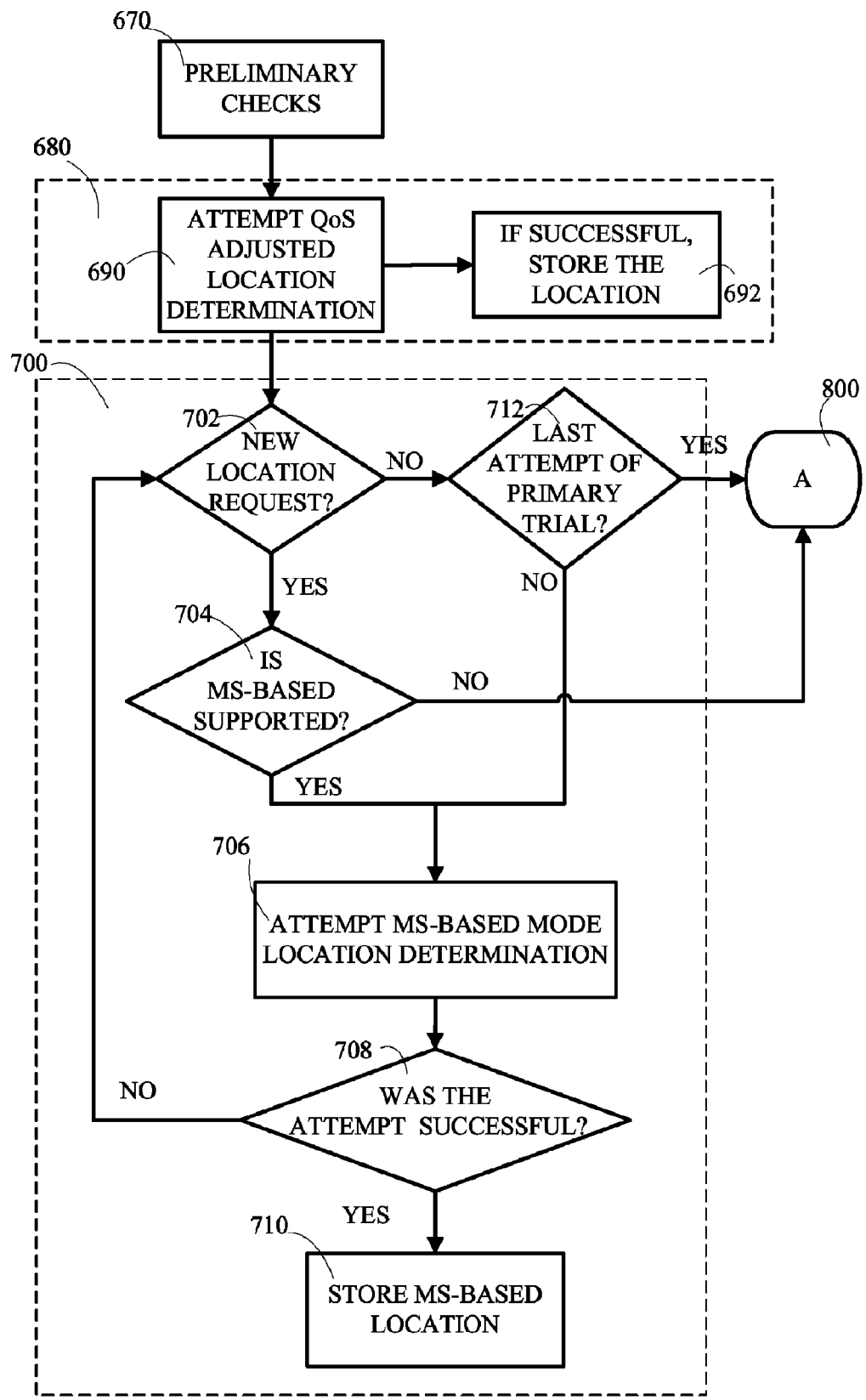
FIGS. 12-14 are a detailed flow diagram illustrating a specific method for location determination in a wireless device in which a preliminary QoS adjustable location determination mode is attempted followed by multiple trials conducted in sequence of which one or more of the trials determine one or more conditions affecting available modes and selects an available mode and/or QoS adjustment based on the conditions, according to an aspect.
Figure 13:
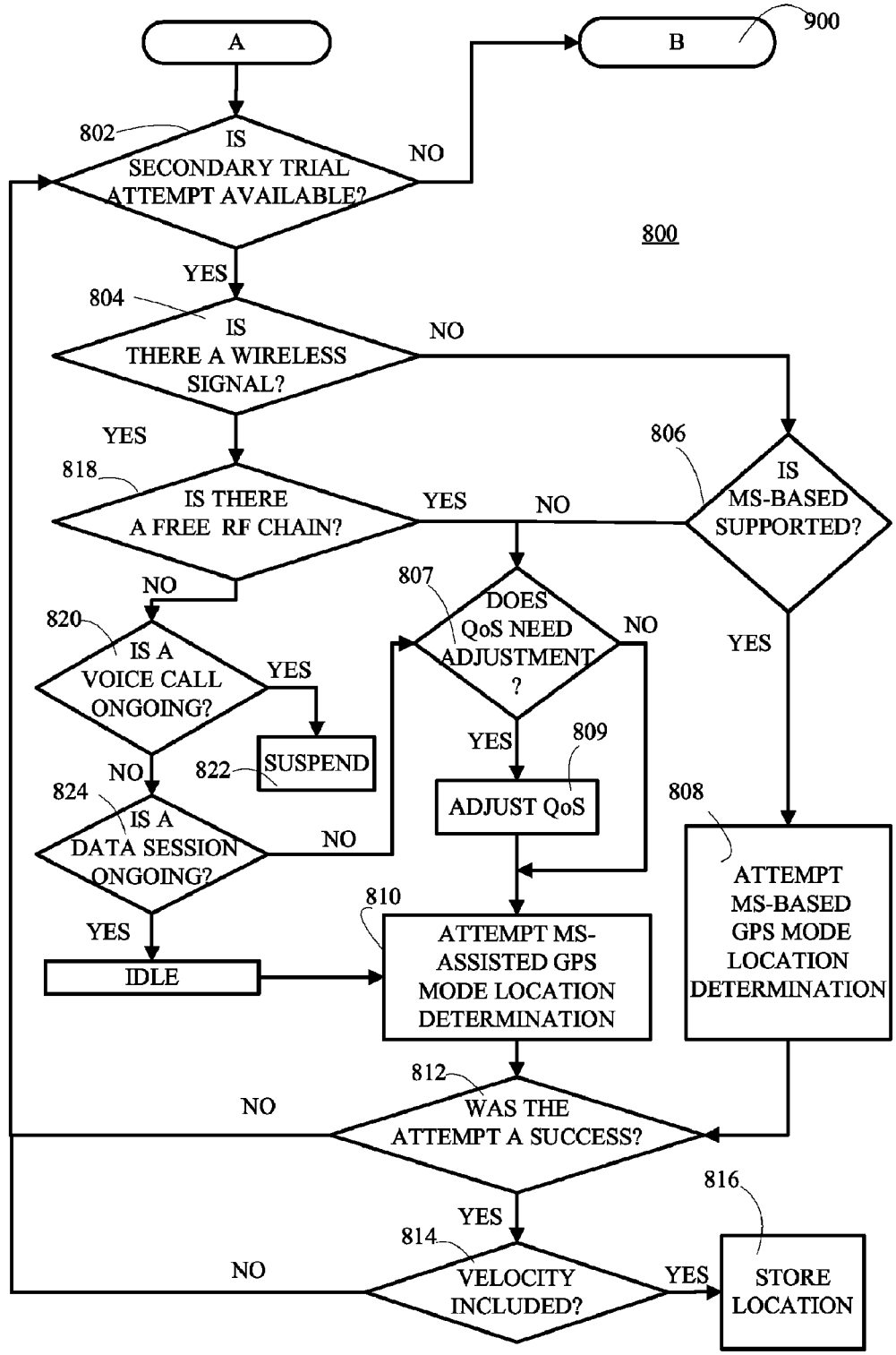
Figure 14:
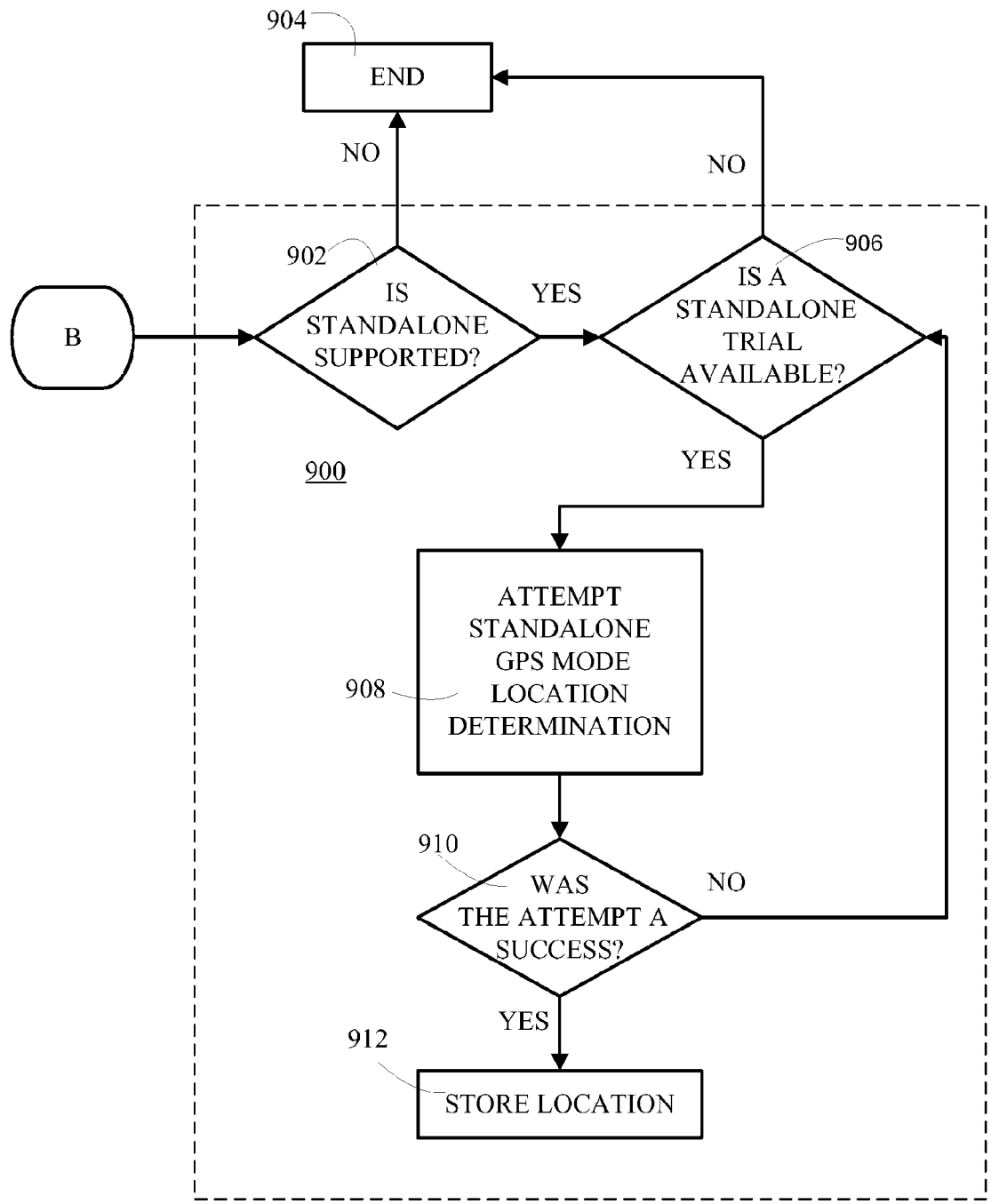

Referring now to FIGS. 12, 13 and 14, a flow diagram illustrating a specific method for location determination in which the mode routine conducts a preliminary single attempt QoS adjusted location determination trial and then sequences through three location determination trials, attempting location determination within a sequenced trial one or more times, determines existing conditions within the second trial and selects the satellite mode and, optionally QoS adjustment based on the determined existing conditions, in accordance with an aspect. Thus, the illustrated aspect provides for a preliminary QoS adjustable location determination mode followed by three trials for subsequent mode selection. The preliminary QoS adjustable location determination mode 680 is typically conducted once and may be the MS-Assisted mode configured to provide both a network-based fix and a satellite-based fix. In such an aspect, the QoS of the MS-Assisted mode is generally lowered, such as to a minimum value, to limit the search time so that only network parameters can be recorded during the search interval and, thus, only a network-based location determination is obtained. The first trial 700 selects MS-Based mode and may attempt more than one location determination attempts before moving to the second trial. The second satellite-based trial 800 selects either the MS-Based or MS-Assisted mode based on the current wireless service state and may attempt the more than one location determination attempt before moving to the third trial. The third satellite-based trial 900 selects the Standalone mode and attempts the mode a predetermined number of times, if all attempts of the Standalone mode are not successful the routine is ended and no satellite-based location determination results.

Referring first to FIG. 12, at Event 670 initial preliminary checks are conducted prior to initiating the location determination routine. Preliminary checks may include necessary checks to insure requisite device conditions or network setting exist to perform location determination, such as proper device power state and the like. After completion of the initial preliminary checks, a preliminary QoS adjustable location determination mode 680 is conducted, such as MS-Assisted mode in which the QoS has been lowered, such as to a minimum level. Lowering the QoS to a minimum level will generally insure that only a network-based location determination is obtained in light of the minimal search time afforded by the lowering of the QoS. At Event 690, the preliminary QoS adjustable location determination mode 680 conducts a QoS adjusted location determination attempt implementing a predetermined QoS adjustable location determination mode, such as MS-Assisted mode having network-based and satellite-based location determination capability or the like. If the QoS adjusted location attempt is successful, at Event 692, the location fix is stored in local device memory and/or otherwise communicated to the location-requesting entity or application. It should be noted that regardless of whether the preliminary QoS adjustable location determination mode 680 is successful, the location determination routine proceeds to the first trial and attempt to determine satellite-based location fix. This is because in the aspect depicted in FIG. 12 the QoS of the QoS adjustable location determination mode 680 is adjusted lower, and in many aspects to a minimum. The lowering of the QoS corresponds to less search time and in many aspects this results in only enough time to record network parameters and obtain a network-based fix (i.e., insufficient time is provided to search for satellite signals). The network-based fix is generally less accurate than satellite-based location determinations and, thus, the location determination routine will proceed to further trials in an attempt to determine a satellite-based fix.

The first trial 700 begins at Event 702, at which a determination is made as to whether this is a new request for a location determination. If it is determined that this is a new request for a location then, at Event 704, a determination is made as to whether MS-Based mode location determination is supported by the wireless device. If MS-Based mode location determination is not supported the routine will skip the first trial 700 and immediately move to the second trial 800, illustrated in FIG. 12 by Block A. If MS-Based mode location mode location determination is supported then, at Event 706, an attempt is made to determine location using the MS-Based mode of location determination. At Event 708, a determination is made as to whether the attempt was successful. If the attempt was successful in determining a location then, at Event 710, the location is stored in local or remote memory.

If the attempt was not successful in determining a location, the routine will return to Event 702, to determine whether the request for location is a new request. If the request is not a new request then, at Event 712, a determination is made as to whether the previous attempt was the last attempt as configured by the trial. The trial may be configured to allow for one or more attempts to determine location under the trial. If the determination is made that the previous attempt was not the last attempt as configured by the trial then, at Event 706, an additional attempt is made to determine location using the MS-Based mode of location determination and, at Event 708, a subsequent determination is made to determine if the attempt was successful. If the attempt was successful, at Event 710, the location is stored or, if the attempt was not successful the routine returns to Event 712 where a determination is made as to whether the previous attempt was the last attempt as configured by the trial. Once the last attempt in the trial is unsuccessfully attempted, the first trial 700 is ended and the routine moves to the second trial 800, illustrated in FIG. 12 by Block A.

Referring to FIG. 13, the second trial 800 is illustrated. The second trial 800 is initiated at Event 802, at which a determination is made as to whether an attempt is available for the second trial. Similar to the first trial, the second trial may be configured to allow for multiple attempts to obtain a location using the second trial. If an attempt is available then, at Event 804, a determination of an existing condition occurs. Specifically, at Event 804, a determination is made as to whether a wireless signal is currently available. If no wireless signal is available then, at Event 806, a determination is made as to whether MS-Based mode location determination is supported by the wireless device. If MS-Based mode location determination is supported then, at Event 808, an attempt is made to determine location using the MS-Based mode of location determination. If MS-Based mode location determination is not supported then, at Event 807, a determination is made as whether the QoS should be adjusted for the pending MS-Assisted mode. The QoS may be adjusted based on the existing conditions, the historical conditions and/or the preconfiguration of the location determination routine. If a determination is made that adjustment of the QoS is warranted, at Event 809, the QoS is adjusted and at Event 810, an attempt is made to determine location using the MS-Assisted mode of location determination. If a determination is made that no adjustment of the QoS is warranted, at Event 810, an attempt is made to determine location using the MS-Assisted mode of location determination.

As previously discussed, MS-Assisted mode requires a wireless signal in order to communicate with the PDE because in MS-Assisted mode the location calculation is accomplished at the PDE. Thus, in order for this attempt to succeed, the wireless signal must have become available since the determination was made at Event 804. Once the attempt for location determination has occurred (at either Event 808 or 810), at Event 812 a determination is made as to whether the attempt was successful. If the attempt was unsuccessful in determining a location, the routine returns to Event 802, to determine if an additional attempt is available for the second trial. If the Attempt was successful then, at Event 814, a velocity check is made to determine if the location determination includes a velocity parameter. If the location determination includes a velocity parameter then, at Event 816, the location is stored in internal or external memory. If the velocity check determines that the location determination does not include a velocity parameter then the routine returns to Event 802, to determine if an additional attempt is available for the second trial.

If at Event 804, a determination is made that a wireless signal is available then, at Event 818, a determination is made as whether a Radio Frequency (RF) Transmit/Receive (Tx/Rx) chain is currently available. If a RF Tx/Rx chain is available then, at Event 807, a determination is made as whether the QoS should be adjusted for the pending MS-Assisted mode. If a determination is made that adjustment of the QoS is warranted, at Event 809, the QoS is adjusted and at Event 810, an attempt is made to determine location using the MS-Assisted mode of location determination. If a determination is made that no adjustment of the QoS is warranted, at Event 810, an attempt is made to determine location using MS-Assisted mode location determination. If an RF Tx/Rx chain is not available then, at Event 820, a determination is made as to whether a voice call is currently ongoing. If a voice call is ongoing then, at Event 822, location determination is suspended. Typically, attempting location determination during a voice call will detrimentally affect the quality of the voice call and, therefore, the location determination process is suspended so as to not adversely affect the user's voice call experience.

If a determination is made that no voice call is currently ongoing the, at Event 824, a determination is made as to whether a data call/session is currently ongoing. If no data session is ongoing then, at Event 807, a determination is made as whether the QoS should be adjusted for the pending MS-Assisted mode. The QoS may be adjusted based on the existing conditions, the historical conditions and/or the preconfiguration of the location determination routine. If a determination is made that adjustment of the QoS is warranted, at Event 809, the QoS is adjusted and at Event 810, an attempt is made to determine location using the MS-Assisted mode of location determination. If a determination is made that no adjustment of the QoS is warranted, at Event 810, an attempt is made to determine location using MS-Assisted mode location determination.

If a data call/session is ongoing then, at Event 826, the routine idles for a predetermined time period in attempt to try and wait to attempt the location determination after the data session has ended. After the predetermined idle period and determination that the data/call session is no longer ongoing, at Event 807, a determination is made as whether the QoS should be adjusted for the pending MS-Assisted mode. The QoS may be adjusted based on the existing conditions, the historical conditions and/or the preconfiguration of the location determination routine. If a determination is made that adjustment of the QoS is warranted, at Event 809, the QoS is adjusted and at Event 810, an attempt is made to determine location using the MS-Assisted mode of location determination. If a determination is made that no adjustment of the QoS is warranted, at Event 810, an attempt is made to determine location using MS-Assisted mode location determination. Once the MS-Assisted mode is attempted, at Event 812, a determination is made as to whether the attempt was successful. If the attempt was successful then, at Event 814, the location is stored in internal or external memory. If the attempt was unsuccessful in determining a location, the routine returns to Event 802, to determine if an additional attempt is available for the second trial. If no further attempts are available for the second trial, the second trial is ended and the routine moves to the third trial 900, illustrated in FIG. 13 as Block B.

Referring to FIG. 14, the third trial 900 is illustrated. At Event 902, a determination is made as to whether Standalone mode is supported by the wireless device. If Standalone mode is not supported, at Event 904, the routine is ended without having successfully determined a location. If Standalone mode is supported then, at Event 906, a determination is made as to whether a standalone trial attempt is available. If no standalone trail attempt is available, at Event 904, the routine is ended without having successfully determined a location. If a Standalone mode attempt is available then, at Event 908, an attempt is made to determine location using Standalone mode location determination. Once the Standalone mode is attempted, at Event 910, a determination is made as to whether the attempt was successful. If the attempt is unsuccessful the routine returns to Event 906 and a determination is made as to whether an additional Standalone mode attempt is available. If the attempt was successful then, at Event 912, the location is stored in internal or external memory.

Figure 15:
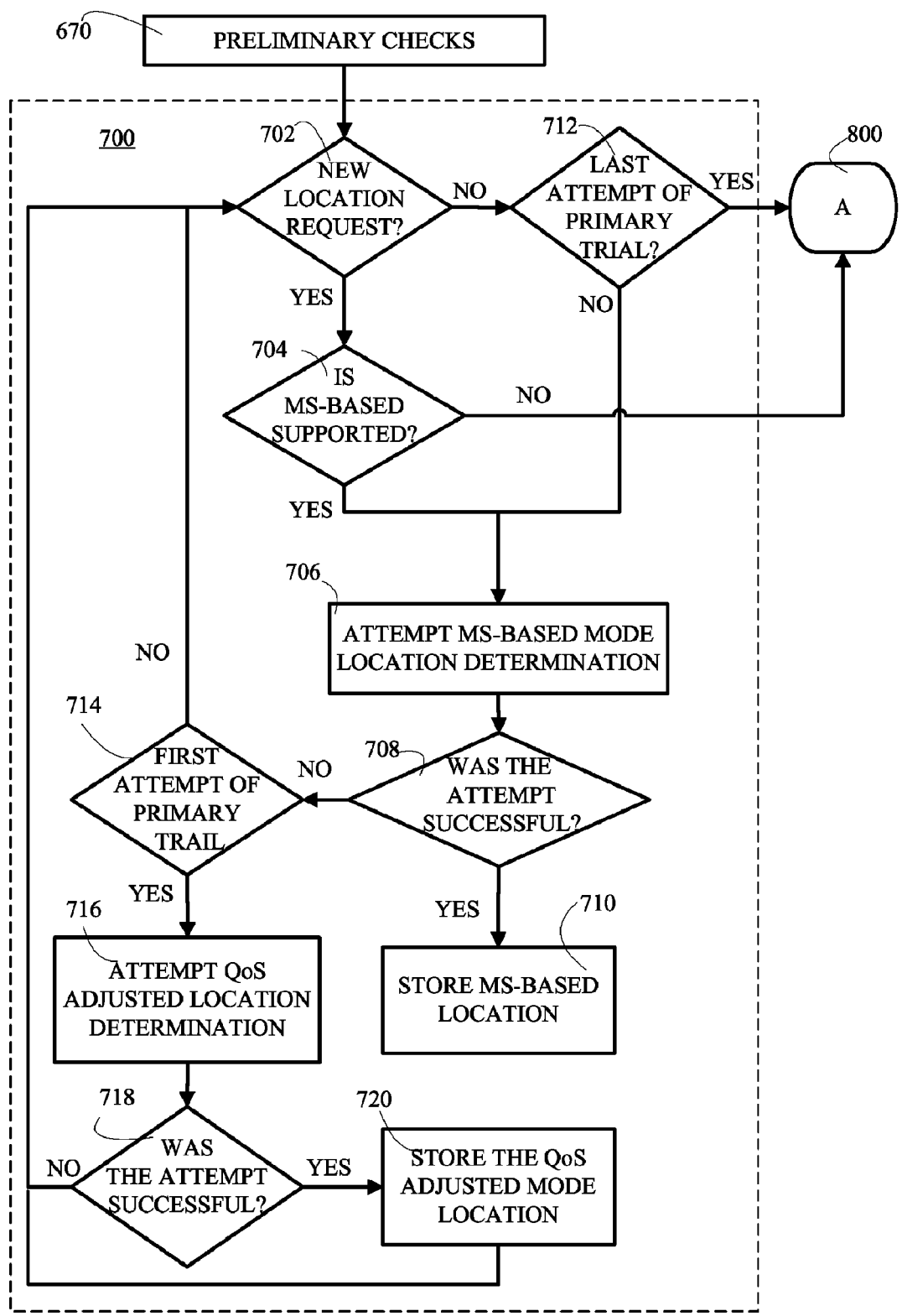
FIG. 15 is a flow diagram illustrating a specific method for location determination in wireless device in which a QoS adjustable location determination mode is attempted after the first attempt of the first trial from amongst a plurality of trails conducted in sequence of which one or more of the trials determine one or more conditions affecting available modes and selects an available mode and/or QoS adjustment based on the conditions, according to another aspect.

Referring to FIG. 15, a flow diagram is presented of a specific alternative aspect in which that mode routine attempts a QoS adjustable location determination mode after the first attempt of the first trial. After completing all configured attempts in the first trail the method proceeds through the sequence of second and third mode trials, which are identical to the second and third satellite-based mode trials discussed in relation to FIGS. 13 and 14. For the purpose of brevity, only FIG. 15 will be discussed in relation to the aforementioned specific alternative method, however, it should be assumed that the discussion of FIGS. 13 and 14 is equally applicable to the second and third mode trails of the aforementioned specific alternative method.

At Event 670, location determination is initiated by conducting requisite preliminary checks. Preliminary checks may include necessary checks to insure requisite device conditions or network setting exist to perform location determination, such as proper device power state and the like. After the completion of preliminary checks, the first trial 700 begins at Event 702, at which a determination is made as to whether this is a new request for a location determination. If it is determined that this is a new request for a location then, at Event 704, a determination is made as to whether MS-Based mode location determination is supported by the wireless device. If MS-Based mode location determination is not supported the routine will skip the first trial 700 and immediately move to the second trial 800, illustrated in FIG. 15 by Block A. If MS-Based mode location mode location determination is supported then, at Event 706, an attempt is made to determine location using the MS-Based mode of location determination. At Event 708, a determination is made as to whether the attempt was successful in determining a location. If the attempt was successful in determining a location then, at Event 710, the location is stored in local or remote memory.

If the attempt was not successful in determining a location then, at Event 714, a determination is made as to whether the previous attempt was the first attempt of the first trial. If it is determined that the previous attempt was the first attempt of the first trial then, at Event 716, a QoS adjustable location determination mode is attempted. For example, the QoS adjustable location determination mode may comprise MS-Assisted mode having both network-based and satellite based-location determination capability and the QoS may be adjusted to a lower or minimum value. As previously discussed, a location fix in which the QoS has been adjusted lower or to minimum level provides for a fallback location fix if all of the remaining mode attempts during all of trials fail or otherwise due not result in a valid location fix. Once the QoS adjusted mode is attempted, at Event 718, a determination is made as to whether the attempt was successful. If the QoS adjusted mode attempt was successful, at Event 720, the result of the QoS adjusted mode location determination is stored either locally or a related network database. If the QoS adjusted mode attempt was unsuccessful or after the result of the QoS adjusted mode result is stored, the flow returns to Event 702 to determine whether the request for a location is new request and if the request is not a new request then, at Event 712, a determination is made as to whether the previous attempt was the last attempt as configured by the trial. It should be noted that regardless of whether the QoS adjusted mode attempt was successful or not, the remaining flow will generally continue in an attempt to determine a location fix.

If, at Event 714, a determination is made that the previous attempt was not the first attempt of the first trial then the flow returns to Event 702 to determine whether the request for a location is new request and if the request is not a new request then, at Event 712, a determination is made as to whether the previous attempt was the last attempt as configured by the trial. It should be noted that as configured the QoS adjusted mode attempt is a single attempt at determining a QoS adjusted fix conducted after the first attempt of the first trial. Generally, only one attempt is needed because of the high success rate of the QoS adjusted mode returning, at least, a network-based location determination. However, in other aspects, the routine may be configured to attempt more than one QoS adjusted mode location fix. The attempt is conducted after the first attempt of the first trial to limit the QoS adjusted mode attempts and to insure that the network parameters used to calculate the QoS adjusted mode fix are closest in time to the initiation of the overall location determination process.

Similar to the flow described in relation to FIG. 12, the first trial of FIG. 15 may be configured to allow for one or more attempts to determine location under the trial. If the determination is made that the previous attempt was not the last attempt as configured by the trial then, at Event 706, an additional attempt is made to determine location using the MS-Based mode of location determination and, at Event 708, a subsequent determination is made to determine if the attempt was successful. If the attempt was successful, at Event 710, the location is stored or, if the attempt was not successful the routine returns to Event 712 where a determination is made as to whether the previous attempt was the last attempt as configured by the trial. Once the last attempt in the trial is unsuccessfully attempted, the first trial 700 is ended and the routine moves to the second trial 800, illustrated in FIG. 12 by Block A.

Figure 16:
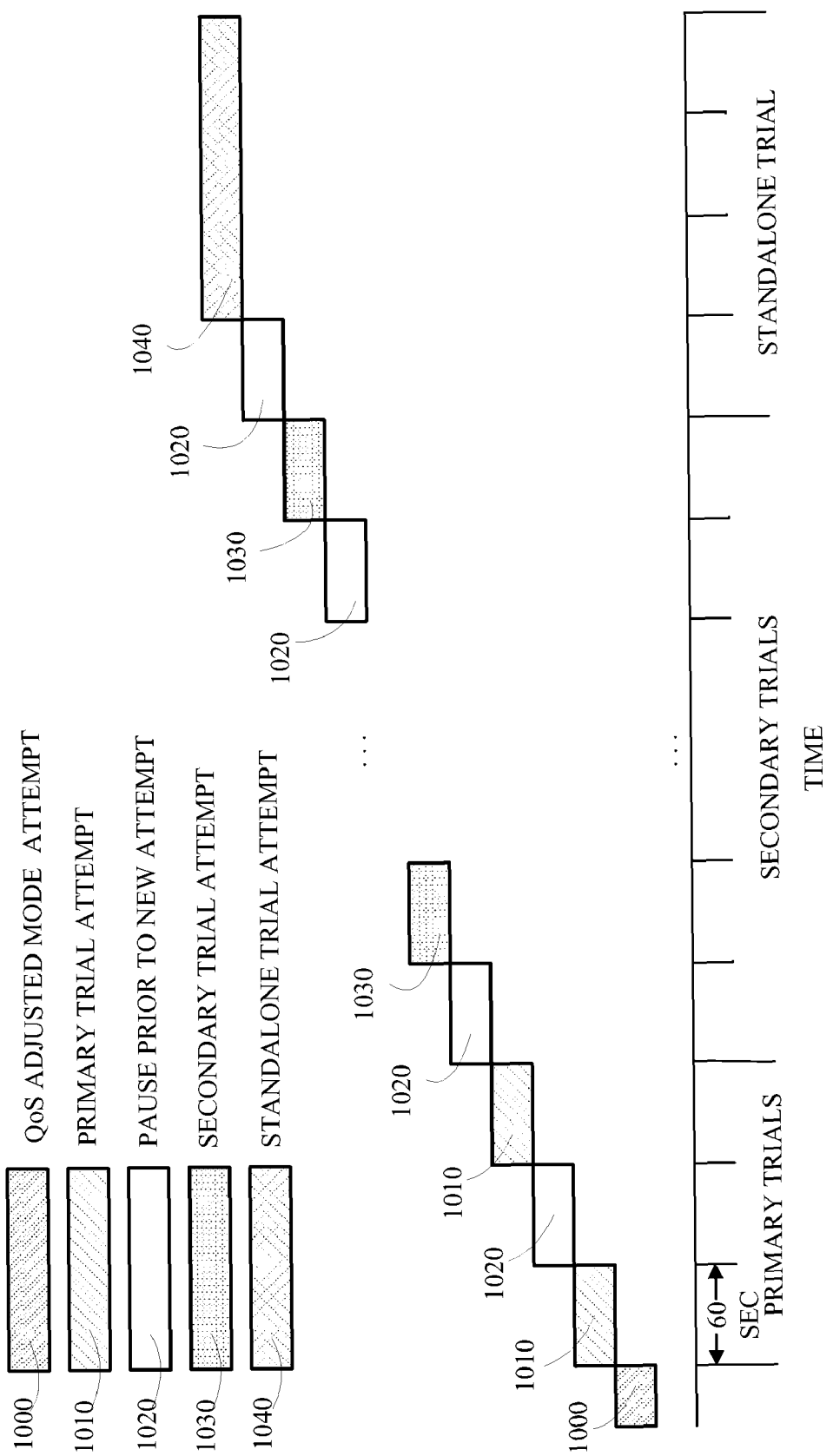
FIG. 16 is a time chart illustrating a method for location determination in which a preliminary QoS adjustable location determination mode is attempted followed by a primary trial, a secondary trial and a standalone trail, according to another aspect.

FIG. 16 is a graphical representation illustrating the timing sequence of location determination routine that includes a preliminary QoS adjustable location determination mode attempt followed by a primary mode trial, a secondary mode trial and a standalone-mode trial, according to an aspect. The QoS adjusted mode attempt 1000 is conducted first and regardless of the result of the attempt the process will continue to sequence through the primary, secondary and standalone trials in an attempt to produce another location fix, typically a more accurate fix. The primary trail includes two primary trial attempts 1010 at a location determination, such as two attempts at MS-Based location determination. It is noted that a pause period 1020 exists between the first and second primary attempts. The pause period 1020 attempts to insure that new conditions exist that may provide for a successful location fix. In the illustrated example, the primary trial attempts 1010 and the pause periods 1020 are approximately one minute in length.

If the two primary trail attempts 1010 are unsuccessful, the routine will sequence to the secondary trials, and secondary trial attempts 1030 are attempted. It is noted, that a pause period 1020 may occur between the last primary trial attempt 1010 and the first secondary trial attempt 1030. In one aspect, the secondary trial attempts may include determining existing conditions affecting location determination and selecting a satellite-based location determination mode and, optionally QoS adjustment based on the conditions. For example, the secondary trial attempts may chose between MS-Based mode and MS-Assisted mode based on existing conditions and determine a QoS adjustment if the MS-Assisted mode is selected In general, the secondary trial may include any number of attempts, for example three-to eight attempts may be made before proceeding to the standalone trial. In the illustrated example, the secondary trial attempts 1030 and the pause periods 1020 are approximately one minute in length.

If all of the preconfigured secondary trial attempts 1030 are unsuccessful, the routine will sequence to the standalone trial, and a standalone trail attempt 1040 is attempted. The standalone trial is generally limited to a single standalone trail attempt 1040 of the Standalone mode. It is noted that a pause period 1020 may occur between the last secondary trial attempt 1030 and the standalone trial attempt 1040. In the illustrated example, the standalone attempt 1040 is approximately two-three minutes in length.

Figure 17:
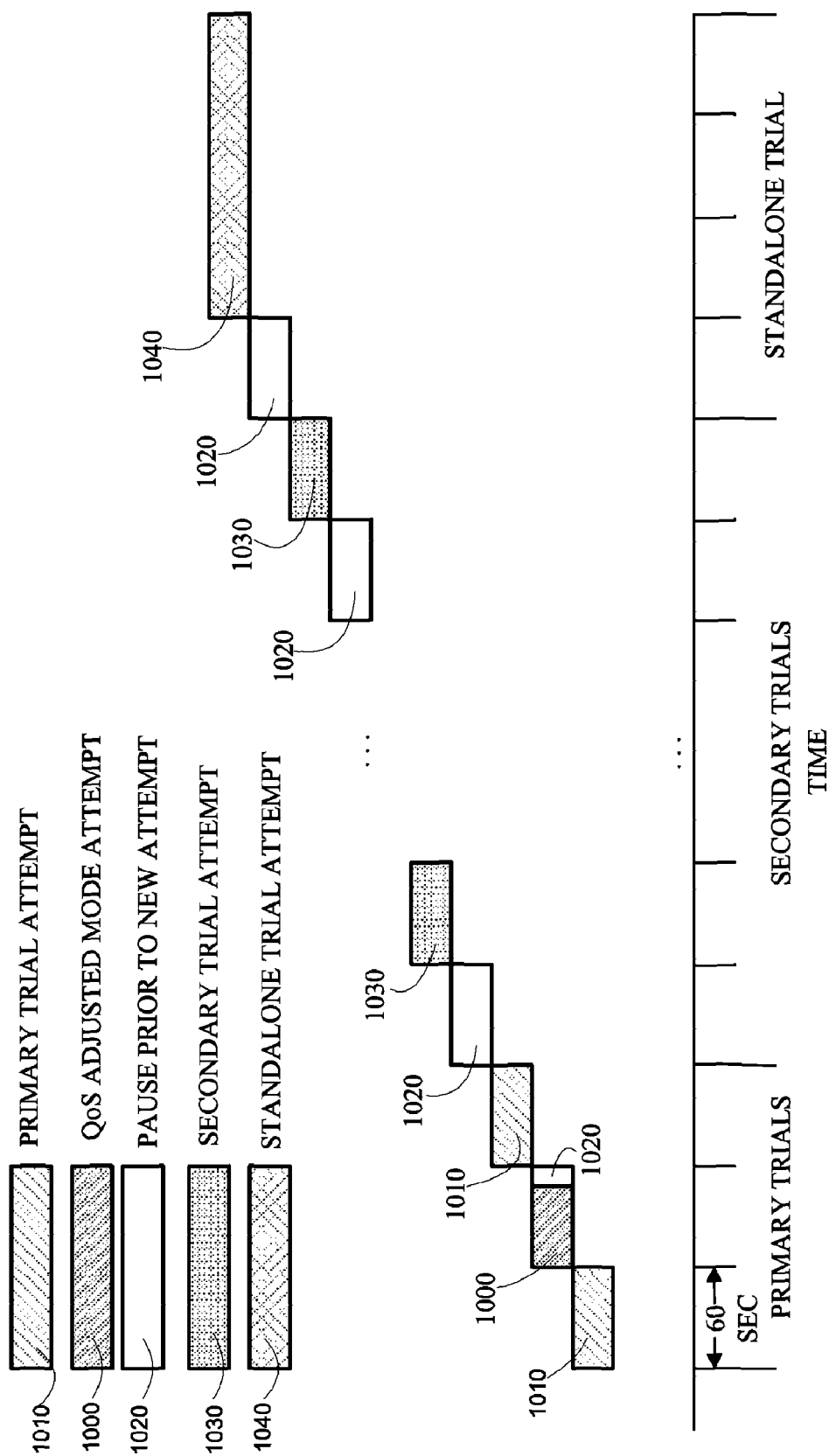
FIG. 17 is a time chart illustrating a method for location determination in which a QoS adjustable location determination mode is attempted after the first attempt of a mode within a primary trial, followed by additional primary mode attempts, a secondary trial and a standalone trail, according to another aspect.

FIG. 17 is a graphical representation illustrating the timing sequence of location determination routine that includes a QoS adjustable location determination mode attempt 1000 after an unsuccessful first primary trial attempt 1010, according to an aspect. In the illustrated example, the primary trail includes two primary trial attempts 1010 of a location determination mode, such as two attempts at MS-Based location determination. After the unsuccessful first primary trial attempt 1010, a QoS adjusted mode attempt 1000 occurs. If the first primary trial attempt is successful, the need for a QoS adjusted location fix is obviated and the overall routine is ended, without the need to attempt the QoS adjustable location determination mode. As shown, the QoS adjusted mode attempt 1000 occurs during the time typically defined as a pause period 1020. The QoS adjusted mode attempt 1000 will generally occur in less time than the allotted pause period, which in some aspects is defined as about one minute. The QoS adjusted mode attempt 1000 is a single attempt configured to occur after the first primary trial attempt 1010. Once the QoS adjusted mode attempt 1000 has occurred, the routine will conduct any additional primary trial attempts and, if the primary trial attempts are all unsuccessful, the routine sequences to the secondary trial attempts 1030. If the secondary trial attempts 1030 are unsuccessful, the routine sequences to the standalone trial attempt 1040.

It should be noted that while the example of FIG. 17 depicts and describes the QoS adjusted mode occurring sequentially after the first satellite-based location attempt of the first trial, it may also be possible to configure the routine such that the QoS adjusted mode occurs simultaneously, at any point in time, during any one of the other mode attempts.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes or instructions on a machine-readable medium and/or computer readable medium, such as may be provided by a computer program product.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, present aspects provide for methods, devices, systems and computer program products that improve the ability of the wireless device to determine location. Present aspects provide for identifying a location determination mode based on a predetermined routine for each location determination that is requested. In certain aspects, the predetermined routine may be configured to adjust the Quality of Service (QoS) for one or more of the location determination modes implemented in the routine. Based on the pre-configuration of the routine, adjustment of the QoS of one or more location determination modes may occur as a matter of course or the routine may be configured to dynamically adjust the QoS based on conditions, such as network conditions, environmental conditions and the like, existing at the point in time in which the location determination mode is executed or adaptively adjust the QoS based on historical conditions that affect location determination.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for location determination in a wireless communication device, the method comprising:
   providing for a predetermined location determination routine that includes a plurality of location determination modes for locating a wireless communication device, the plurality of location determination modes including a Quality of Service (QoS) adjustable location determination mode having an adjustable QoS parameter which corresponds to a maximum allowable search time the wireless communication device is allowed to obtain a location fix, said QoS parameter including multiple levels, each level defining a quality imparted to the QoS adjustable determination mode;
   receiving a request for a location of the wireless communication device;
   attempting, by the wireless communication device, to obtain a location of the wireless communication device by executing a first location determination mode from the predetermined location determination routine;
   determining, by the wireless communication device, whether to perform adaptive QoS adjustment or dynamic QoS adjustment, wherein said wireless communication device is capable of performing either adaptive QoS adjustment or dynamic QoS adjustment;
   wherein dynamic QoS adjustment consists of steps (a) through (c):
   (a) adjusting the adjustable QoS parameter of the QoS adjustable location determination mode to a lower level, corresponding to a higher search time value, if the attempt to obtain a location by executing the first location determination mode fails;
   (b) attempting to obtain the location of the wireless communication device by executing the QoS adjustable location determination mode; and
   (c) storing in memory a result of the attempt to obtain the location of the wireless communication device by executing the QoS adjustable location determination mode; and
   wherein adaptive QoS adjustment consists of steps (d) and (e):
   (d) adjusting the adjustable QoS parameter according to a historical conditions database in the wireless communication device with historical conditions of the network; and
   (e) storing in memory a result of the attempt to obtain the location of the wireless communication device by executing the QoS adjustable location determination mode.

2. The method of claim 1, wherein providing for a predetermined location determination routine that includes a plurality of location determination modes including a Quality of Service (QoS) adjustable location determination mode further defines the QoS adjustable location determination mode as Mobile Station-Assisted mode (MS-Assisted mode).

3. The method of claim 1, further comprising wherein determining, prior to adjusting the adjustable QoS parameter of the QoS adjustable location determination mode, whether to make a lower QoS adjustment for the QoS adjustable location determination mode.

4. The method of claim 3, wherein determining whether to make a QoS adjustment further comprises determining whether to make a lower QoS adjustment based on the pre-configuration of the predetermined location determination routine.

5. The method of claim 3, wherein determining whether to make a QoS adjustment further comprises determining whether to make a dynamic lower QoS adjustment based on one or more existing conditions affecting location determination.

6. The method of claim 4, wherein determining whether to make a dynamic QoS adjustment based on one or more existing conditions affecting location determination further comprises whether to make a dynamic QoS adjustment based on one or more existing conditions affecting location determination, wherein the existing conditions are further defined as at least one wireless signal state, voice call state, data call state, battery power state and location determination entity information state.

7. The method of claim 3, wherein determining whether to make a QoS adjustment further comprises determining whether to make an adaptive lower QoS adjustment based on historical conditions affecting location determination.

8. The method of claim 1, wherein adjusting the adjustable QoS parameter of the QoS adjustable location determination mode to a lower level further comprises adjusting the adjustable QoS parameter of the QoS adjustable location determination mode to a minimum level.

9. The method of claim 1, further comprising adjusting the adjustable QoS parameter of the QoS adjustable location determination mode to a higher level after the attempt to obtain a location of the wireless communication device by executing the QoS adjustable location determination mode.

10. The method of claim 9, further comprising determining, prior to adjusting the adjustable QoS parameter of the QoS adjustable location determination mode to a higher level, whether to make a higher QoS adjustment for the QoS adjustable location determination mode.

11. At least one processor configured to determine location in wireless communication device, comprising:
a first module for providing for a predetermined location determination routine that includes a plurality of location determination modes for locating the wireless communication device, the plurality of location determination modes including a Quality of Service (QoS) adjustable location determination mode having an adjustable QoS parameter which corresponds to a maximum allowable search time the wireless communication device is allowed to obtain a location fix, said QoS parameter including multiple levels, each level defining a quality imparted to the QoS adjustable determination mode;
a second module, comprising hardware, for receiving a request for a location of the wireless communication device;
a third module for attempting to obtain a location of the wireless communication device by executing a first location determination mode from the predetermined location determination routine;
a fourth module for determining whether to perform adaptive QoS adjustment or dynamic QoS adjustment, wherein said wireless communication device is capable of performing either adaptive QoS adjustment or dynamic QoS adjustment;
a fifth module for performing dynamic QoS adjustment, consisting of the sixth module through the eighth module below:
a sixth module for adjusting the adjustable QoS parameter of the QoS adjustable location determination mode to a lower level, corresponding to a higher search time value, if the attempt to obtain a location by executing the first location determination mode fails;
a seventh module for attempting to obtain the location of the wireless communication device by executing the QoS adjustable location determination mode; and
an eighth module for storing in memory a result of the attempt to obtain the location of the wireless communication device by executing the QoS adjustable location determination mode; and
a ninth module for performing adaptive QoS adjustment, consisting of the tenth module and the eleventh module below:
a tenth module for adjusting the adjustable QoS parameter according to a historical conditions database in the wireless communication device with historical conditions of the network; and
an eleventh module for storing in memory a result of the attempt to obtain the location of the wireless communication device by executing the QoS adjustable location determination mode.

12. A computer program product, comprising:
a non-transitory computer-readable medium in a wireless communication device, comprising:
at least one instruction for causing a computer in said wireless communication device to provide for a predetermined location determination routine that includes a plurality of location determination modes for locating a wireless communication device, the plurality of location determination modes including a Quality of Service (QoS) adjustable location determination mode having an adjustable QoS parameter which corresponds to a maximum allowable search time the wireless communication device is allowed to obtain a location fix, said QoS parameter including multiple levels, each level defining a quality imparted to the QoS adjustable determination mode;
at least one instruction for causing the computer in said wireless communication device to receive a request for a location of the wireless communication device;
at least one instruction for causing the computer in said wireless communication device to attempt to obtain a location of the wireless communication device by executing a first location determination mode from the predetermined location determination routine;
at least one instruction for causing the computer in said wireless communication device to determine whether to perform adaptive QoS adjustment or dynamic QoS adjustment, wherein said wireless communication device is capable of performing either adaptive QoS adjustment or dynamic QoS adjustment;

at least one set of instructions for causing the computer in said wireless communication device to perform dynamic QoS adjustment consisting of instructions (a) through (c):

(a) at least one instruction for causing the computer in said wireless communication device to adjust the adjustable QoS parameter of the QoS adjustable location determination mode to a lower level, corresponding to a higher search time value, if the attempt to obtain a location by executing the first location determination mode fails;

(b) at least one instruction for causing the computer in said wireless communication device to attempt to obtain the location of the wireless communication device by executing the QoS adjustable location determination mode; and (c) at least one instruction for causing the computer in said wireless communication device to store in memory a result of the attempt to obtain the location of the wireless communication device by executing the QoS adjustable location determination mode; and at least one set of instructions for causing the computer in said wireless communication device to perform adaptive QoS adjustment consisting of instructions (d) and (e):

(d) at least one instruction for causing the computer in said wireless communication device to adjust the adjustable QoS parameter according to a historical conditions database in the wireless communication device with historical conditions of the network; and (e) at least one instruction for causing the computer in said wireless communication device to store in memory a result of the attempt to obtain the location of the wireless communication device by executing the QoS adjustable location determination mode.

13. A wireless communication device, comprising:

means for providing for a predetermined location determination routine that includes a plurality of location determination modes for locating the wireless communication device, the plurality of location determination modes including a Quality of Service (QoS) adjustable location determination mode having an adjustable QoS parameter which corresponds to a maximum allowable search time the wireless communication device is allowed to obtain a location fix, said QoS parameter including multiple levels, each level defining a quality imparted to the QoS adjustable determination mode;

means for receiving a request for a location of the wireless communication device;

means for attempting to obtain a location of the wireless communication device by executing a first location determination mode from the predetermined location determination routine;

means for determining, by the wireless communication device, whether to perform adaptive QoS adjustment or dynamic QoS adjustment, wherein said wireless communication device is capable of performing either adaptive QoS adjustment or dynamic QoS adjustment;

means for performing dynamic QoS adjustment consisting of items (a) through (c):

(a) means for adjusting the adjustable QoS parameter of the QoS adjustable location determination mode to a lower level, corresponding to a higher search time value, if the attempt to obtain a location by executing the first location determination mode fails;

(b) means for attempting to obtain the location of the wireless communication device by executing the QoS adjustable location determination mode; and (c) means for storing in memory a result of the attempt to obtain the location of the wireless communication device by executing the QoS adjustable location determination mode; and means for performing adaptive QoS adjustment consists of items (d) and (e):

(d) means for adjusting the adjustable QoS parameter according to a historical conditions database in the wireless communication device with historical conditions of the network; and (e) means for storing in memory a result of the attempt to obtain the location of the wireless communication device by executing the QoS adjustable location determination mode.

* * * * *